United States Patent
Miyazaki et al.

(10) Patent No.: US 7,330,957 B2
(45) Date of Patent: Feb. 12, 2008

(54) USER-BASED ALLOCATION AND DEALLOCATION OF STORAGE IN A STORAGE SYSTEM

(75) Inventors: Fumi Miyazaki, Kawasaki (JP); Masayasu Asano, Yokohama (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 10 days.

(21) Appl. No.: 10/892,957

(22) Filed: Jul. 16, 2004

(65) Prior Publication Data
US 2005/0257003 A1 Nov. 17, 2005

(30) Foreign Application Priority Data
May 14, 2004 (JP) ............... 2004-144644

(51) Int. Cl.
*G06F 12/02* (2006.01)
(52) U.S. Cl. ............ 711/171; 711/172; 711/170
(58) Field of Classification Search ............... None
See application file for complete search history.

(56) References Cited

U.S. PATENT DOCUMENTS

| 5,295,575 | A * | 3/1994 | Gonzalez ............... 711/5 |
| 6,295,575 | B1 | 9/2001 | Blumenau et al. |
| 6,574,589 | B1 * | 6/2003 | Shoyama ............... 703/25 |
| 6,631,442 | B1 | 10/2003 | Blumenau |
| 6,728,737 | B2 | 4/2004 | Wollrath et al. |
| 6,799,260 | B1 | 9/2004 | Tunali et al. |
| 6,810,462 | B2 * | 10/2004 | Matsunami et al. ......... 711/112 |
| 2001/0001870 | A1 * | 5/2001 | Ofek et al. ............... 711/112 |
| 2004/0098537 | A1 * | 5/2004 | Serizawa ............... 711/112 |
| 2004/0181600 | A1 * | 9/2004 | Yamagami ............... 709/229 |
| 2004/0260861 | A1 | 12/2004 | Serizawa et al. |
| 2005/0097243 | A1 * | 5/2005 | Yamashita et al. ............. 710/38 |

FOREIGN PATENT DOCUMENTS

| JP | 2002-222061 | 9/2002 |
| JP | 2003-330622 | 11/2003 |

OTHER PUBLICATIONS

SNIA Storage Networking Industry Association, "SNIA Storage Management Initiative Specification version 1.0.1.", pp. 178-220, pp. 233-270, Sep. 12, 2003, San Francisco, California.

\* cited by examiner

*Primary Examiner*—B. James Peikari
(74) *Attorney, Agent, or Firm*—Townsend and Townsend and Crew LLP

(57) ABSTRACT

A management server includes the user management segment information having stored therein a volume managed by a user, a receiving unit for receiving a volume allocation request from a management computer, a sending unit for sending the volume allocation request to a storage system and an updating unit for updating the user management segment information based on the information on the allocated volume received from the storage system. The storage system includes a unit for receiving the volume allocation request from the management server, and based on the volume allocation request, allocating the volume from the unallocated volume that can be allocated by all the users.

23 Claims, 16 Drawing Sheets

FIG. 3A

| USER ID (161) | PASSWORD (162) | NAMESPACE (163) | UNALLOCATED VOLUME NO. (164) | ALLOCATED VOLUME NO. (165) | VOLUME CAPACITY (GB) (166) | COMPUTER (167) | LIMIT VOLUME CAPACITY INFORMATION (GB) (168) |
|---|---|---|---|---|---|---|---|
| A | *** | N-A | 80 | 91 | 100 | COMPUTER A | 200 |
| B | **** | N-B | 80 | 93 | 50 | COMPUTER B | 100 |

| USER ID (161) | PASSWORD (162) | NAMESPACE (163) | UNALLOCATED VOLUME NO. (164) | ALLOCATED VOLUME NO. (165) | VOLUME CAPACITY (GB) (166) | COMPUTER (167) | LIMIT VOLUME CAPACITY INFORMATION (GB) (168) |
|---|---|---|---|---|---|---|---|
| A | *** | N-A | 80 | 91 | 100 | COMPUTER A | 200 |
| B | **** | N-B | 80 | 93 | 50 | COMPUTER B | 100 |
| B | ** | N-C | 80 | | | | 100 |

(160)

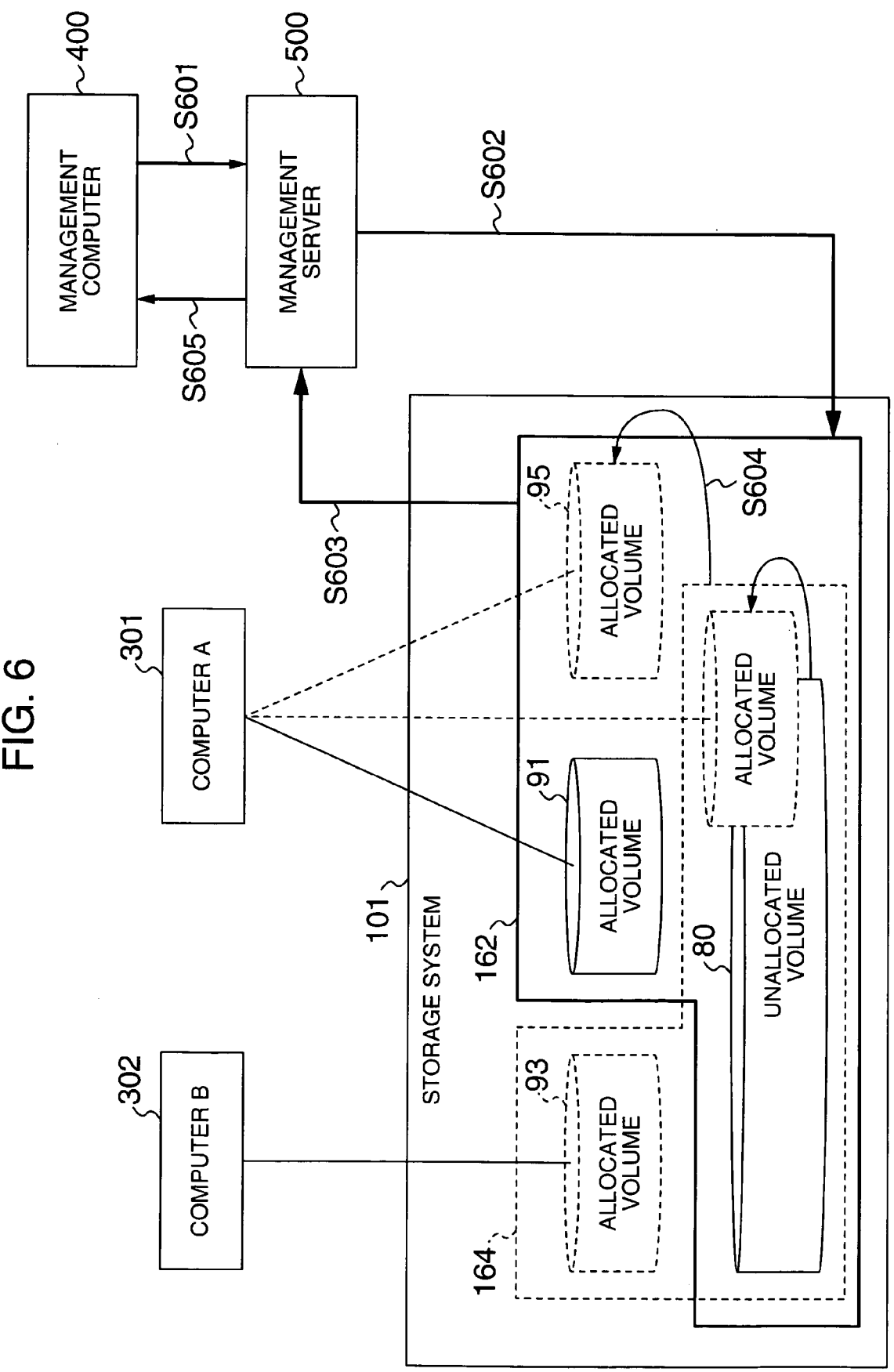

| USER ID 161 | PASSWORD 162 | NAMESPACE 163 | UNALLOCATED VOLUME NO. 164 | ALLOCATED VOLUME NO. 165 | VOLUME CAPACITY (GB) 166 | COMPUTER 167 | LIMIT VOLUME CAPACITY INFORMATION (GB) 168 |
|---|---|---|---|---|---|---|---|
| A | *** | N-A | 80 | 91 | 100 | COMPUTER A | 200 |
|   |   |   |   | 95 | 50 | COMPUTER A |   |
| B | **** | N-B | 80 | 93 | 50 | COMPUTER B | 100 |

| VOLUME NO. 181 | VOLUME CAPACITY (GB) 182 | COMPUTER 183 |
|---|---|---|
| 91 | 100 | COMPUTER A |
| 93 | 50 | COMPUTER B |
| 95 | 100 | COMPUTER A |

| VOLUME NO. 186 | UNALLOCATED VOLUME CAPACITY (GB) 187 |
|---|---|
| 80 | 200 |

FIG. 10
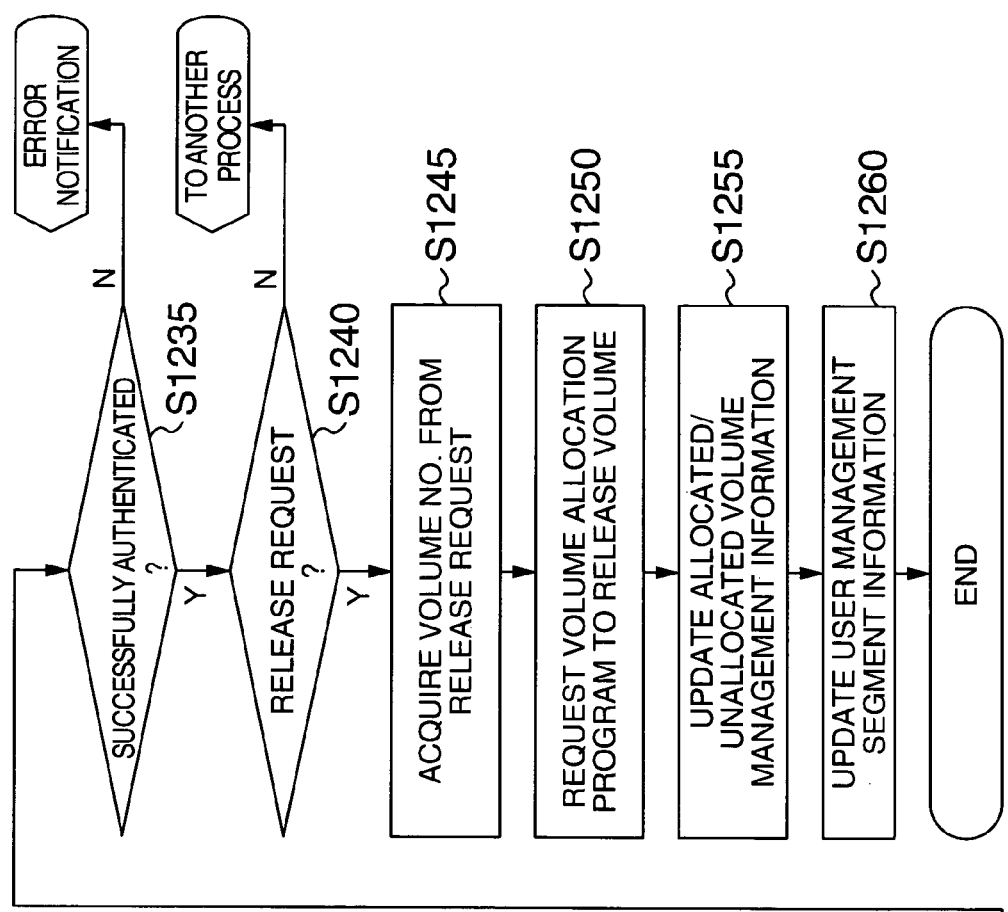
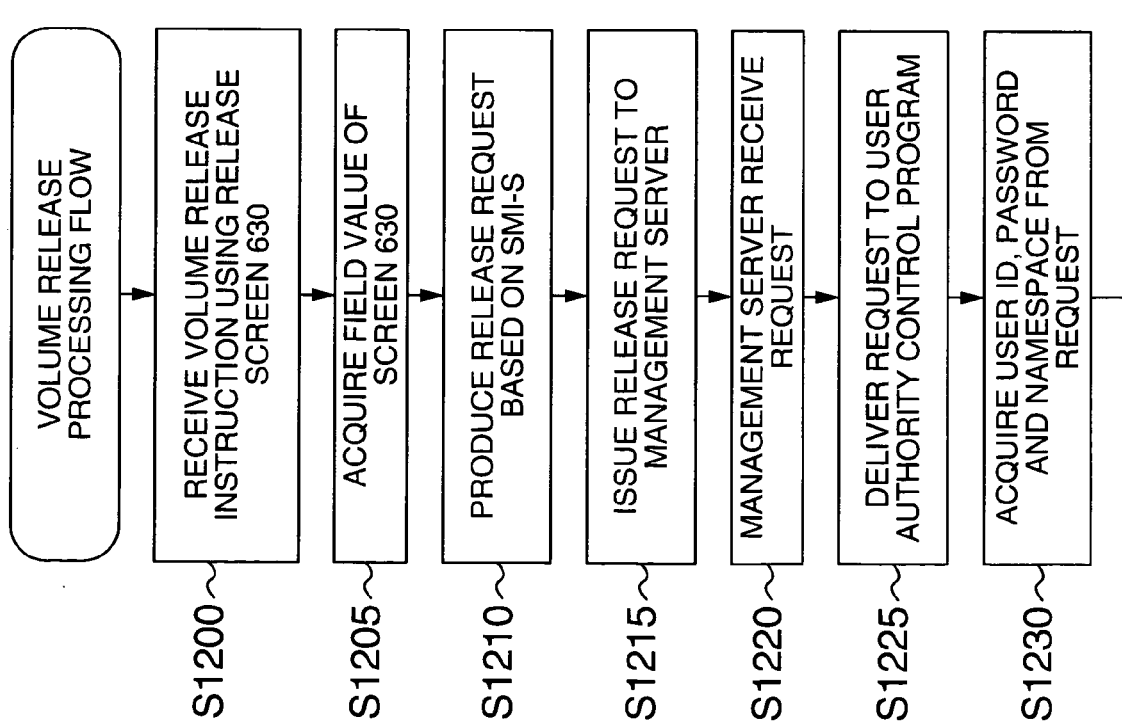

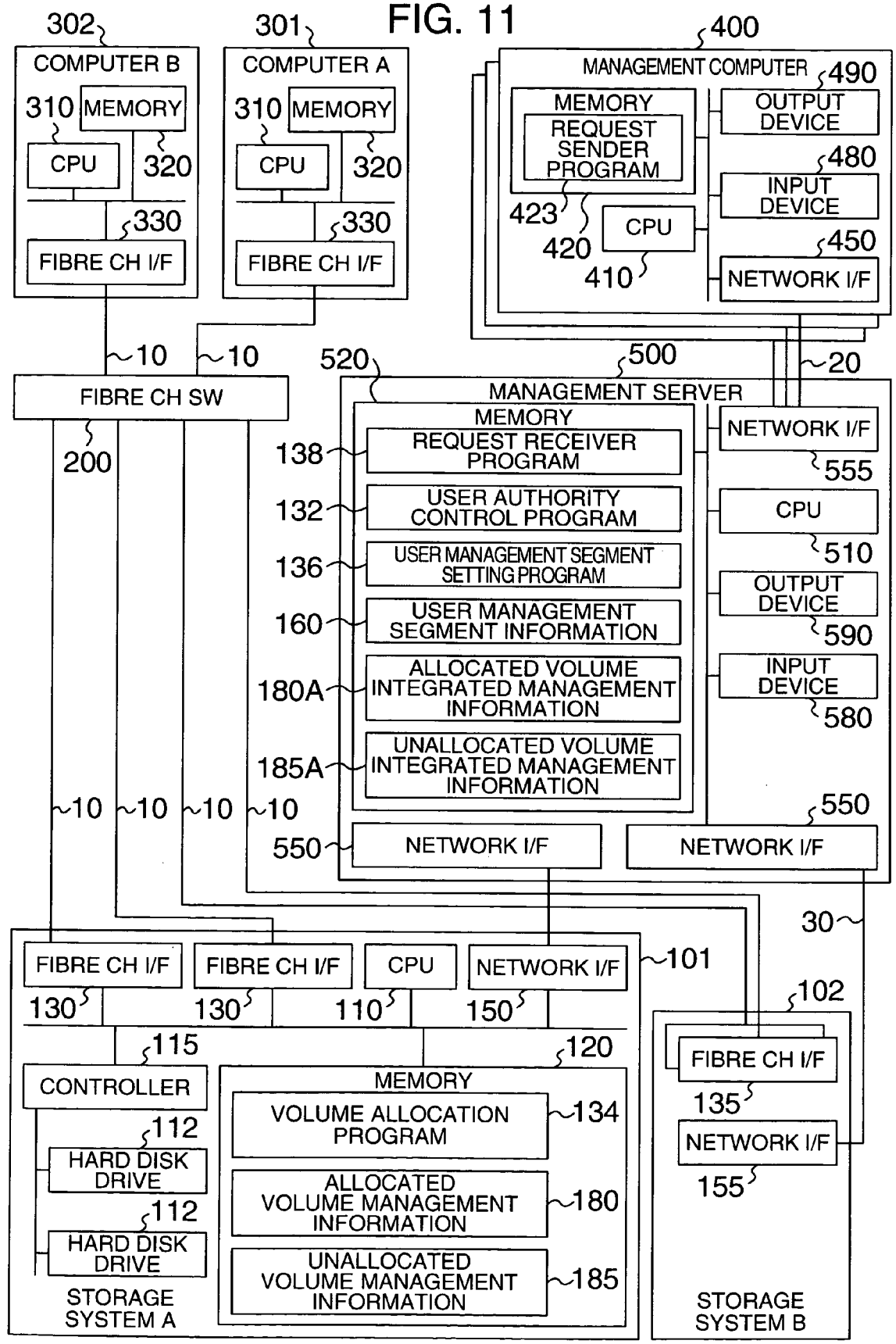

FIG. 15A

| USER ID | PASSWORD | NAMESPACE | UNALLOCATED VOLUME NO. | ALLOCATED VOLUME NO. |
|---|---|---|---|---|
| A | *** | N | 80 | 91 |
|   |   |   |   | 95 |
| B | **** |   | 80 | 93 |
|   |   |   |   |   |

| VOLUME NO. | STORAGE SYSTEM | VOLUME CAPACITY (GB) | COMPUTER |
|---|---|---|---|
| 91 | STORAGE SYSTEM A | 100 | COMPUTER A |
| 93 | STORAGE SYSTEM B | 50 | COMPUTER B |
| 95 | STORAGE SYSTEM A | 100 | COMPUTER A |

| VOLUME NO. | STORAGE SYSTEM | UNALLOCATED VOLUME CAPACITY (GB) |
|---|---|---|
| 80 | STORAGE SYSTEM A | 200 |
|   | STORAGE SYSTEM B | 200 |

186 / 188 / 187 / 185A

USER-BASED ALLOCATION AND DEALLOCATION OF STORAGE IN A STORAGE SYSTEM

INCORPORATION BY REFERENCE

The present application claims priority from Japanese application JP 2004-144644 filed on May 14, 2004, the content of which is hereby incorporated by reference into this application.

BACKGROUND OF THE INVENTION

The present invention relates to a technique for managing at least a storage system, or, in particular, to a technique for setting a volume of a storage system for each user of the storage system.

With the growing computerization of intra-company data, the amount of information to be processed has increased and intra-company data management costs are constantly increasing. In other words, companies bear the burden of increased costs due to an unpredictable increase in the amount of data which requires management through complicated data management tools and the expansion of the installation of data storage space. As a result, the practice has become widespread to entrust the data management to a SSP (storage service provider), etc. The SSP provides a service which enables a plurality of companies to share a storage system.

With regard to prior art techniques for the sharing of a storage system, JP-A-2003-330622 (hereinafter referred to as Patent Reference 1) discloses a method in which a general administrator of a computer system allocates the volume of the storage system to each user (individual administrator) and sets the right of each user to access the allocated volume. In this way, within the framework of allocation and release operations available to a user to make the volume accessible to a user, each user can alter the computer system's configurations for the allocation or release of the volume for each computer used by a user. JP-A-2002-222061 (hereinafter referred to as Patent Reference 2), on the other hand, discloses a method in which the storage pool management component of a storage system is configured so that the volume is selected from the storage pool and allocated to each computer in response to a volume allocation request.

A management interface is available for the user to allocate a volume of capacity which the user requires from a storage pool to a computer without resorting to enlisting a storage system manufacturer or vendor to assist with the allocation process. In SNIA Storage Management Initiative Specification version 1.0.1 (pp. 178 to 220, pp. 233 to 270), Sep. 12, 2003, Storage Network Industry Association, (hereinafter referred to as Non-Patent Reference 1), for example, the SNIA (Storage Networking Industry Association) set forth a specification of the management interface of the storage system based on the standards of CIM (Common Information Model) and WBEM (Web-Based Enterprise Management), as defined by the DMTF (Distributed Management Task Force). This specification is disclosed in SMI-S (Storage Management Initiative Specification).

In a case where the general administrator of the computer system allocates a volume of the storage system to each user (individual administrator), it is difficult to predict the volume capacity used by each user. Underestimation or overestimation of capacity may cause too little or too much of the volume to be allocated to each user. As a result, the utilization rate of the volume of the storage system as a whole would be reduced and the TCO (total cost of ownership) of the storage system would increase. Also, the general administrator is required to monitor the current utilization of the volume allocated to each user and, in the case where the volume runs short or is excessive, adjust or redistribute the volumes that are already allocated among the users. This imposes a considerable workload on the general administrator. Nevertheless, Patent Reference 1 fails to take this point into consideration.

In a case where a plurality of users each allocate the volume of the storage system to an arbitrarily chosen computer, on the other hand, each user accesses or alters the configuration of the volume allocated by the particular user. Specifically, in a case where each user accesses the volume allocated by him or her, it is impractical to simultaneously display all the volumes allocated by all the users. Also, a security problem is posed if each user is in a position to alter the configuration of the volume allocated by other users. This point, however, is not addressed by Patent Reference 2.

BRIEF SUMMARY OF THE INVENTION

The present invention has been conceived in view of this situation, and the object thereof is to provide a technique with which each user can take full advantage of the volume of a storage system by allocating a required volume.

In order to achieve the object described above, according to one aspect of the invention, a computer system and a storage system managing method are provided, wherein the unallocated volume accessible from all the users is generated in the storage system, and, if further volume is required by a user, the user allocates the volume from the unallocated volume. The management right of the user is set in the volume allocated to the computer by the user.

The storage system managing method comprises the steps of: obtaining the user management information comprising the information on a user and the volume, which is set in the management right of that user; receiving from an external system a volume allocation request including information on a user and a computer to be allocated; allocating, in response to a volume allocation request, the volume to the computer from the unallocated volume of the storage system adapted to be allocated by all the users; and registering, in the user management information, the volume that has been allocated in the allocation step as a volume, contained in the user information, managed by the user.

The above and other objects, features and advantages of the present invention will be made apparent by the following detailed description taken in conjunction with the accompanying drawings.

BRIEF DESCRIPTION OF THE DRAWINGS

FIGS. 3A and 3B are diagrams illustrating the configuration of the user management segment information.

FIG. 6 is a schematic diagram showing the volume allocation process.

FIGS. 8A to 8C are diagrams showing examples of the user management segment information, the allocated volume management information, and the unallocated volume management information.

FIG. 10 is a flowchart showing the volume release process.

FIG. 11 is a schematic diagram showing a computer system according to a second embodiment of the invention.

FIGS. 15A to 15C are diagrams showing examples of the user management segment information, the allocated volume integrated management information, and the unallocated volume integrated management information.

DETAILED DESCRIPTION OF THE INVENTION

According to one embodiment of the present invention, the volume of capacity of a storage system is allocated or released by the management interface of the storage system using CIM and WBEM standards. CIM is a management model standard for a computer system defined by the DMTF, and is a standard that is not limited to implementation by a particular hardware or vendor. The entity to be managed is expressed as an instance having information on the attributes and functions of each management object using CIM. Allocation of the volume from unallocated volume and release of the volume to unallocated volume are managed in the namespace called NameSpace. In other words, a volume allocation request is issued to the target namespace. WBEM, on the other hand, is a method of facilitating system management using CIM as defined by the DMTF. Specifically, WBEM is a set of standards in which the data model information of the CIM standard is encoded in the XML (Extensible Markup Language) language and transmitted on HTTP (Hyper Transfer Protocol). The standard specification of the storage management interface, based on the standards of CIM and WBEM, is disclosed in SMI-S.

Figure 1:
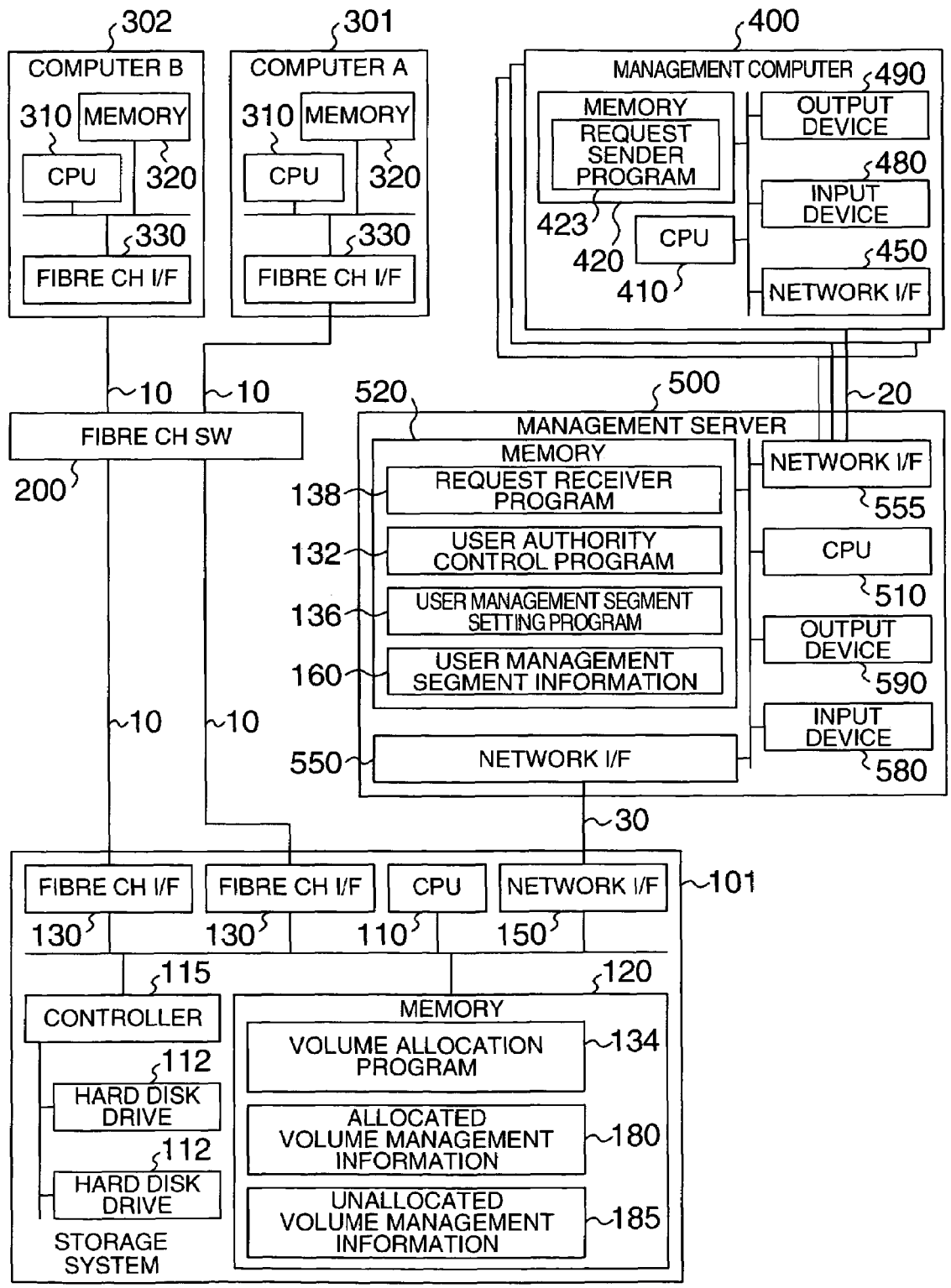
FIG. 1 is a schematic diagram showing a computer system according to a first embodiment of the invention.

FIG. 1 is a schematic diagram showing a computer system according to a first embodiment of the present invention. As shown in FIG. 1, the computer system according to this embodiment comprises a plurality of computers A301, B302, a storage system 101, a plurality of management computers 400, and a management server 500. The computers A301, B302, and the storage system 101 are connected to each other through a fiber channel switch 200. The computers A301, B302 and the storage system 101 are connected to the fiber channel switch 200 using a fiber channel 10. The management computers 400 are connected to the management server 500, and the management server 500 is connected to the storage system 101, by dedicated communication lines 20, 30, respectively, which are connecting channels that are different from the fiber channel 10. The dedicated communication lines 20, 30 may be a network such as the Internet.

The computers A301, B302 are devices for conducting a predetermined job using the data stored in the storage system 101. The computers A301, B302 each include a memory 320 for storing a program and the information required to execute the program, a CPU 310 for executing the program on the memory 320, and a fiber channel interface 330 for communication with the storage system 101. The program, the information required to execute the program, and the data generated by execution of the program are stored in or acquired from the volume of the storage system 101 allocated to each of the computers A301, B302 by the CPU 310 through the fiber channel interface 330. Although not shown, the computers A301, B302 may each include input devices such as a keyboard, a mouse, and an output device such as a display.

The storage system 101 is a device for storing the data and the program used by the computers A301, B302. The storage system 101 includes two fiber channel interfaces 130, a network interface 150 for communication with the management computers 400, a memory 120 for storing the program, and the information required to execute the program, a CPU 110 for executing the program held by the memory 120, a hard disk drive unit 112 providing a physical storage medium, and a controller 115 for controlling at least one hard disk drive unit 112. The controller 115 controls at least one hard disk drive unit 112 as a redundant RAID (redundancy array of inexpensive disks). The controller 115 thus controls parts of arrays or whole arrays of a RAID as a logical volume.

The memory 120 has stored therein a volume allocation program 134 for allocating the volume from the unallocated volume in response to a volume allocation request and connecting to the fiber channel interface 130. The memory 120 also has stored therein the allocated volume management information 180 and the unallocated volume management information 185, described below. These programs and information are stored in a medium such as a hard disk drive unit 112. At the time of starting the storage system 101, the CPU 110 executes the programs loaded from the storage medium to the memory 120, thereby implementing various functions, described below.

The management server 500 is a device for managing the storage system 101. The management server 500 includes a network interface 550 for communication with the storage system 101, a network interface 555 for communication with the management computers 400, a memory 520 for storing a program and the information required to execute the program, a CPU 510 for executing the program held by the memory 520, an output device 590 such as a display for displaying the process of executing the program and for displaying a request-designating screen used by the general administrator managing the computer system, and an input device 580 for inputting a request instruction of the general administrator.

Stored within the memory 520 are a request receiver program 138 for receiving the request from the management computers 400, a user authority control program 132 for analyzing the request received by the request receiver program 138 and identifying the user who has issued the request in order to execute the process, a user management segment-setting program 136 for registering the allocated volume in the management segment of the requesting user and the user management segment information 160, described below. These programs are stored in a medium such as a hard disk drive unit, not shown, and the CPU 510 executes these programs loaded from the medium to the memory 520. In this way, the various functions, described below, are implemented.

According to this embodiment, the CPU 510 of the management server 500 executes the request receiver program 138, the user authority control program 132, and the user management segment-setting program 136. However, this invention is not limited to this configuration of a computer system. For example, the computer system may not include the management server 500 but the storage system 101 may have the function of the management server 500. Specifically, the memory 120 of the storage system 101 further includes the request receiver program 138, the user authority control program 132, the user management segment-setting program 136, and the user management segment information 160 of the management server 500, shown in the drawing, and these programs may be executed by the CPU 110 of the storage system 101.

The management computer 400 is a device that enables the user to allocate or release the volume of the storage system 101. The user executes the programs of the management computers 400 to effect management of the storage system 101. The management computers 400 each include a network interface 450 for communication with the management server 500, a memory 420 for storing a program and the information required to execute the program, a CPU 410 for executing the program held by the memory 420, an output device 490 such as a display for displaying a request-designating screen and for displaying the process of executing the program, and an input device 480 for inputting the request designation of the user. Also, stored within the memory 420 is a request sender program 423 for generating an allocation request or a release request. The CPU 410 performs the function of sending the request to the storage system 101 by executing the request sender program 423 stored in the memory 420.

According to this embodiment, a plurality of management computers 400 are included for the management of a situation in which a SSP provides the service to a plurality of users (companies). Specifically, each user operates a management computer 400 unique to him or her. However, this invention is not limited to this case, and thus a plurality of users may share one management computer 400.

According to this embodiment, the CPU 410 of the management computer 400 executes the request sender program 423. However, the present invention is not limited to this method. For example, the computer system may not include the management computer 400, but the management server 500 may have the function of the management computer 400. Specifically, the memory 520 of the management server 500 further includes the request sender program 423 of the management computer 400, and the CPU 510 of the management server 500 executes this program.

Next, the volume of the storage system 101 will be described.

The volume of the storage system 101 is an area for storing the data and programs, and is located on the hard disk drive unit 112. The volume is roughly divided into an allocated volume and an unallocated volume (storage pool). The allocated volume is connected to the fiber channel interface 130 by the controller 115 and accessible by the computer A301 or B302. The unallocated volume, on the other hand, is not connected to the fiber channel interface 130 by controller 115 and is not accessible by the computers A301 and B302.

As the result of the execution of the volume allocation program 134, the allocated volume is set to be managed in the allocated volume management information 180 and the unallocated volume in the unallocated volume management information 185.

Figure 2A:
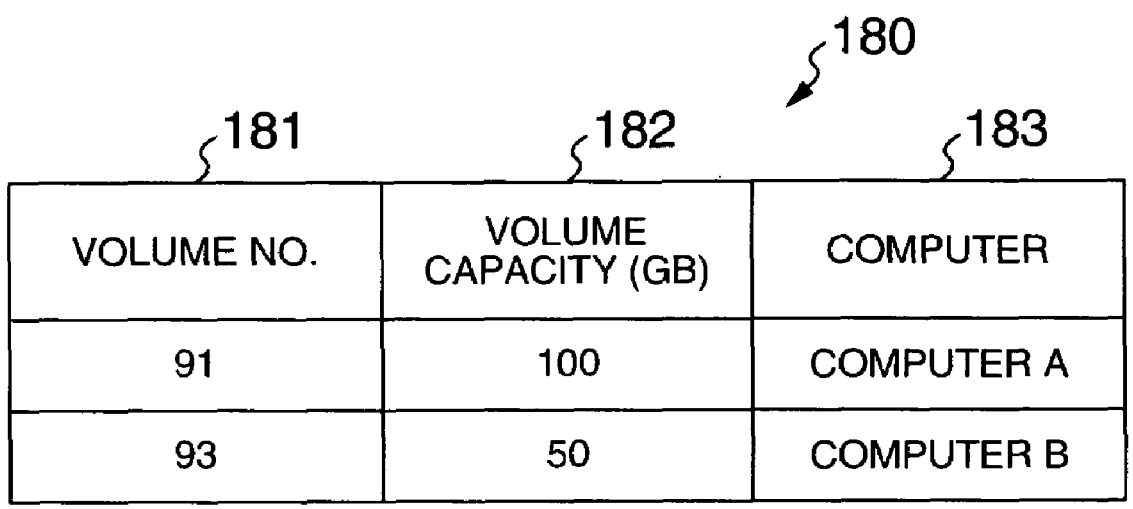
FIGS. 2A and 2B are diagrams illustrating the configuration of the allocated volume management information and the unallocated volume management information, respectively.

FIG. 2 shows an example of the allocated volume management information 180 and the unallocated volume management information 185. The allocated volume management information 180 shown in FIG. 2A includes a volume number 181, a volume capacity 182, and a computer 183. The volume number 181 identifies the volume set on the hard disk drive unit 112. The volume capacity 182 is the capacity of the corresponding volume number 181. The ID information for identifying the computer to which the corresponding volume is allocated is set in the computer 183. According to this embodiment, for the sake of convenience, either the "computer A" or the "computer B" is set in the computer 183. The identifier WWN (World Wide Name) may alternatively be set in the computer 183. WWN is an identifier used by the fiber channel interface 130 of the storage system 101 to identify the fiber channel interface 330 of a particular computer from which the access is obtained.

Figure 2B:
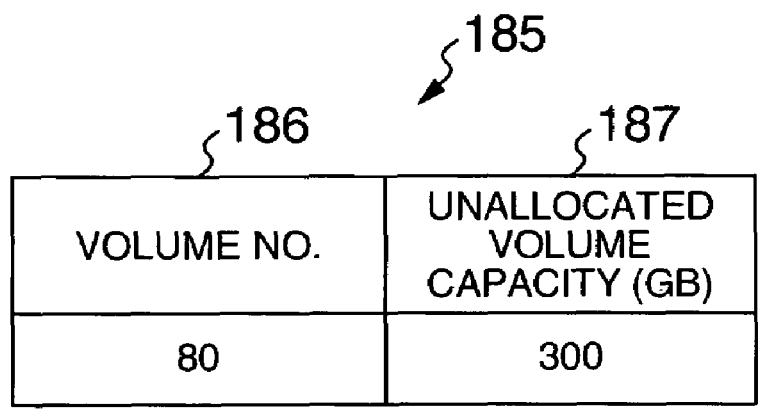

The unallocated volume management information 185 shown in FIG. 2B, on the other hand, includes a volume number 186 and a volume capacity 187. The volume number 186 is a number that identifies the unallocated volume set on the hard disk drive unit 112. The volume capacity 187 is the capacity of the corresponding unallocated volume number 186. In this embodiment, a general administrator manages the unallocated volume.

The sum of the volume capacity 182 of the allocated volume management information 180 plus the volume capacity 187 of the unallocated volume management information 185 constitutes the total volume capacity held by the storage system 101. Also, the unallocated volume management information 185 may include a threshold column, not shown, in which a predetermined volume capacity is set as a threshold. In the case where the unallocated volume capacity 187 is decreased below a predetermined volume capacity set in the threshold column, the storage system 101 outputs a signal, indicating that the unallocated volume capacity 187 has decreased below the threshold, to the management computer 400 or the output devices 490, 590 of the management server 500 and thus can notify the user or the general administrator.

Next, the user management segment information 160 defining the management segment for each user will be described. The user management segment information 160 is stored in the memory 520 of the management server 500.

FIG. 3A is a diagram showing an example of the user management segment information 160. The user management segment information 160 pertaining to each user managing the volume of the storage system 101 includes a user ID 161, a password 162, a namespace 163 indicating the segment managed by the user, an unallocated volume number 164 available for use, an allocated volume number 165, an allocated volume capacity 166, a computer 167, and volume limit capacity information 168 indicating the maximum volume capacity that can be allocated to the computer for each user.

An example of the namespace 163 is NameSpace, defined in CIM. According to this embodiment, a different namespace is set for a different user. The user having the user ID 161 of "A," for example, uses the namespace "N-A," and the user having the user ID 161 of "B" uses the namespace "N-B." The allocated volume management information 180 of the storage system 101 and the volume number stored in the unallocated volume management information 185 are registered (set) in the unallocated volume number column 164 and the allocated volume number column 165. In other words, the volume number 181 of the allocated volume management information 180 is registered in the allocated volume number column 165. This process indicates that the user has allocated the volume to his or her computer from the unallocated volume set in the unallocated volume number column 164. As a result of setting the volume number in the allocated volume number column 165, the user's management right is set in the particular volume in order to exclude configuration change or access by other users.

The specific example shown in FIG. 3A indicates that the user having the user ID 161 of "A" (hereinafter referred to as "the user A") and the user having the user ID 161 of "B" (hereinafter referred to as "the user B") can use the volume of the unallocated volume number 164 of "80." FIG. 3A also indicates that the user A manages the volume having the volume number 165 of "91" and the user B manages the volume having the volume number 165 of "93."

The volume limit capacity information 168 is not essential to the user management segment information 160. By setting the segment available for use by the user in the volume limit capacity information 168 in advance, however, a specific user is prevented from monopolizing the unallocated volume.

Next, a description is provided illustrating how the user management segment information-setting screen displayed on the output device 590 of the management server 500 to permit the general administrator to set the user management segment information 160.

Figure 4:
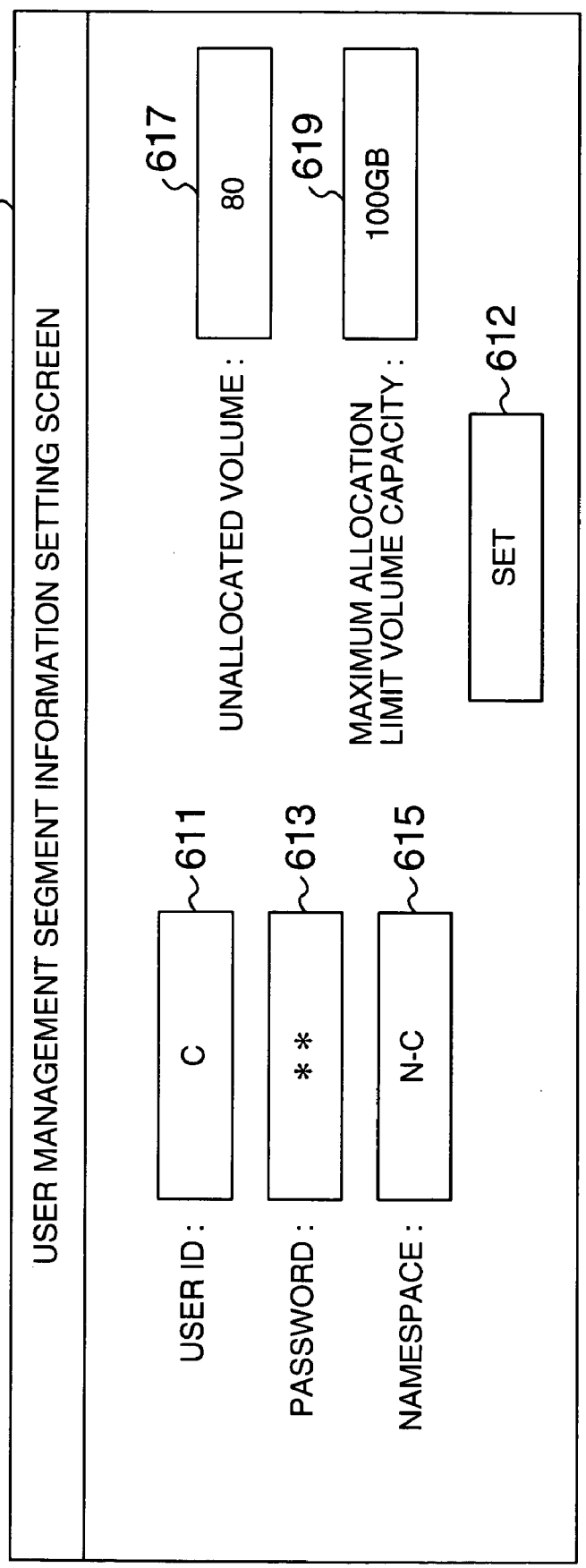
FIG. 4 is a diagram showing an example of the user management segment information-setting screen.

FIG. 4 is a diagram showing an example of the user management segment information-setting screen 610. The user management segment information-setting screen 610, as shown in FIG. 4, includes a user ID field 611 for inputting the ID of the user managing the volume, a password field 613 for inputting a password, a namespace field 615 for inputting a namespace, an unallocated volume field 617 for inputting the unallocated volume number available for use by the user, a maximum allocation volume limit capacity field 619 for inputting the maximum volume capacity that can be allocated by the user, and a setting button 612 for receiving the instruction to update the user management segment information 160 based on the information input to these fields. In a case where the user C is newly added to the user management segment information 160 (FIG. 3A), for example, the general administrator inputs the information as shown in FIG. 4 using the input device 580 and depresses the setting button 612. Upon depression of the setting button 612, the CPU 510 executes the user ID authority control program 132. Thus, the value input to each field is received and the user management segment information 160 is updated.

FIG. 3B is a diagram showing an example of the user management segment information 160 thus updated. As shown in FIG. 3B, the information on the user C that has been input on the setting screen 610 of FIG. 4 is added. Accordingly, the added user C can then allocate the volume using the unallocated volume "80" of the storage system 101, and the maximum volume capacity that can be allocated is 100 GB.

The general administrator of this computer system sets in advance the unallocated volume usable by each user and the maximum volume capacity allocable using the user management segment information-setting screen 610. As a result of this advance setting procedure, each user can use the required volume capacity from the unallocated storage capacity. In this way, the volume of the storage system 101 as a whole can be effectively utilized.

Next, an explanation is provided describing how various screens are used to give an instruction to the management server 500 from the control computers 400.

First, the communication between the control computers 400 and the management server 500, based on WBEM standards, is conducted by exchanging the message encoded in XML using HTTP. In this process, in order to maintain communication security between the control computers 400 and the management server 500, HTTP Basic authentication is carried out. Specifically, each time a request is issued from the control computer 400, the management server 500 carries out the HTTP Basic authentication using the user ID and the user's password. The authentication may be conducted alternatively using HTTP MD5 or HTTPS (Hyper Transfer Protocol Security). According to this embodiment, the control computers 400 input the required items, such as user ID and the user's password, from the log-in screen before volume allocation or release by the user.

Figure 5A:
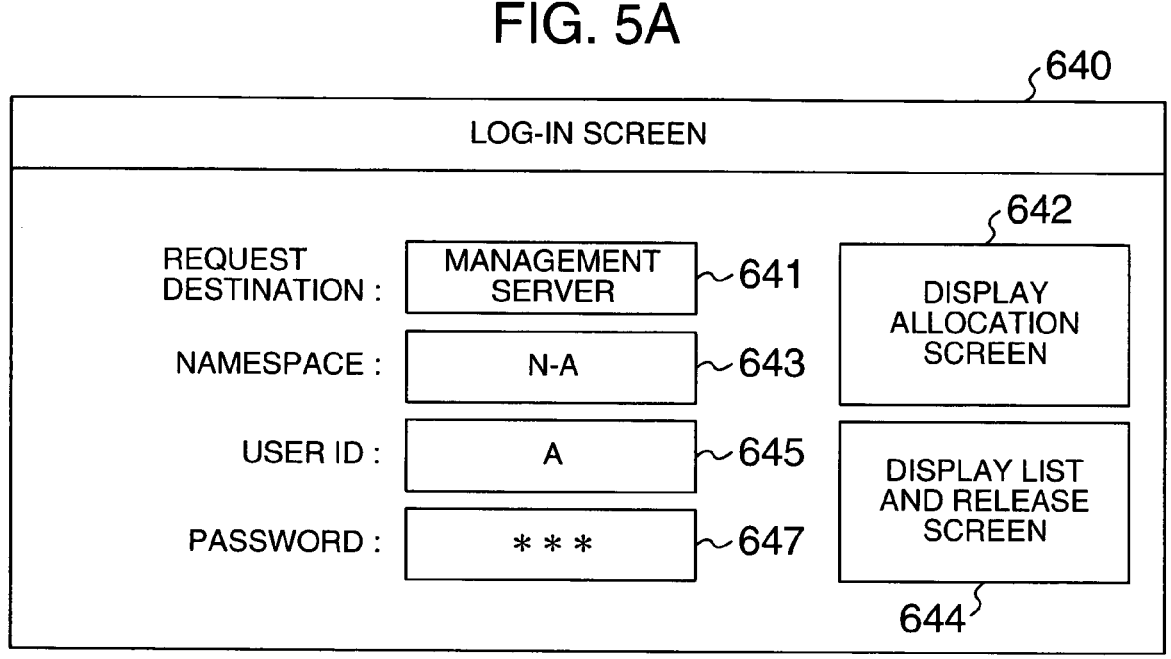
FIGS. 5A to 5C are diagrams showing examples of various screens which are output to the management computer.

FIG. 5A shows an example of the log-in screen 640 displayed on the output device 490 of the management computers 400. The log-in screen 640 includes a request destination field 641 for inputting the device to which various requests are issued, a namespace field 643 for inputting the namespace set for the user, a user ID field 645 for inputting the ID of the particular user, a password field 647 for inputting the password, a button 642 for displaying the allocation screen for allocating the volume, and a button 644 for displaying the screen for releasing the volume.

In the example shown in FIG. 5A, the device name "management server 500" is input into the request destination field 641. Alternatively, the IP address assigned to the network interface 555 of the management server 500 may be input into the same field Also, this embodiment includes the management server 500 for managing the storage system 101, and therefore the management server 500 is input into the request destination field 641. In the case where the storage system 101 shares the function of the management server 500, however, the information of the IP address assigned to the network interface 150 of the storage system 101 or "storage system 101" is input into the request destination field 641.

The log-in screen 640 is displayed on the output device 490 by the CPU 410 executing the request sender program 423 stored in the memory of the management computer 400. Also, the CPU 410 receives the information (including the instructions) entered by the user into each input field of the log-in screen 640 using the input device 480, and, based on the information thus received, produces a request message. The CPU 410 then sends to the management server 500 the request message that has been input into the request destination field 641 through the network interface 450. The CPU 410 holds in the memory 420 the user ID, the password and the namespace input through the log-in screen 640. The CPU 410 sends the user ID, the password and the namespace thus stored in the memory 420, together with the request message, based on the information received on the volume allocation screen or the release screen described later.

Next, the volume allocation screen will be described. Upon depression of the allocation screen display button 642 on the log-in screen 640, the CPU 410 sends the request message to the management server 500. Upon completion of authentication by the management server 500, the CPU 410 displays the volume allocation screen 620 shown in FIG. 5B on the output device 490.

Figure 5B:
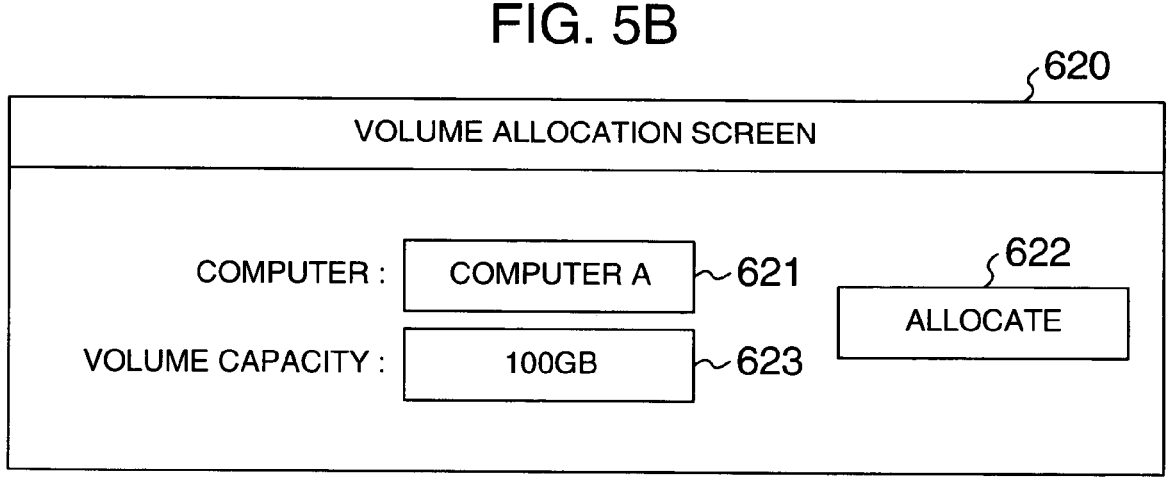

The volume allocation screen 620 shown in FIG. 5B includes a field 621 for inputting the volume-allocating computer, a field 623 for inputting the volume capacity to be allocated and an allocation button 622 for giving an allocation instruction.

Next, the volume release screen will be explained. Upon depression of the release screen display button 644 on the log-in screen 640, the CPU 410 sends the request message to the designated management server 500. Upon user authentication by the management server 500, the CPU 410 displays the volume release screen 630, shown in FIG. 5C, on the output device 490. The volume release screen is also used as a screen for displaying a list of volumes allocated to each user.

Figure 5C:
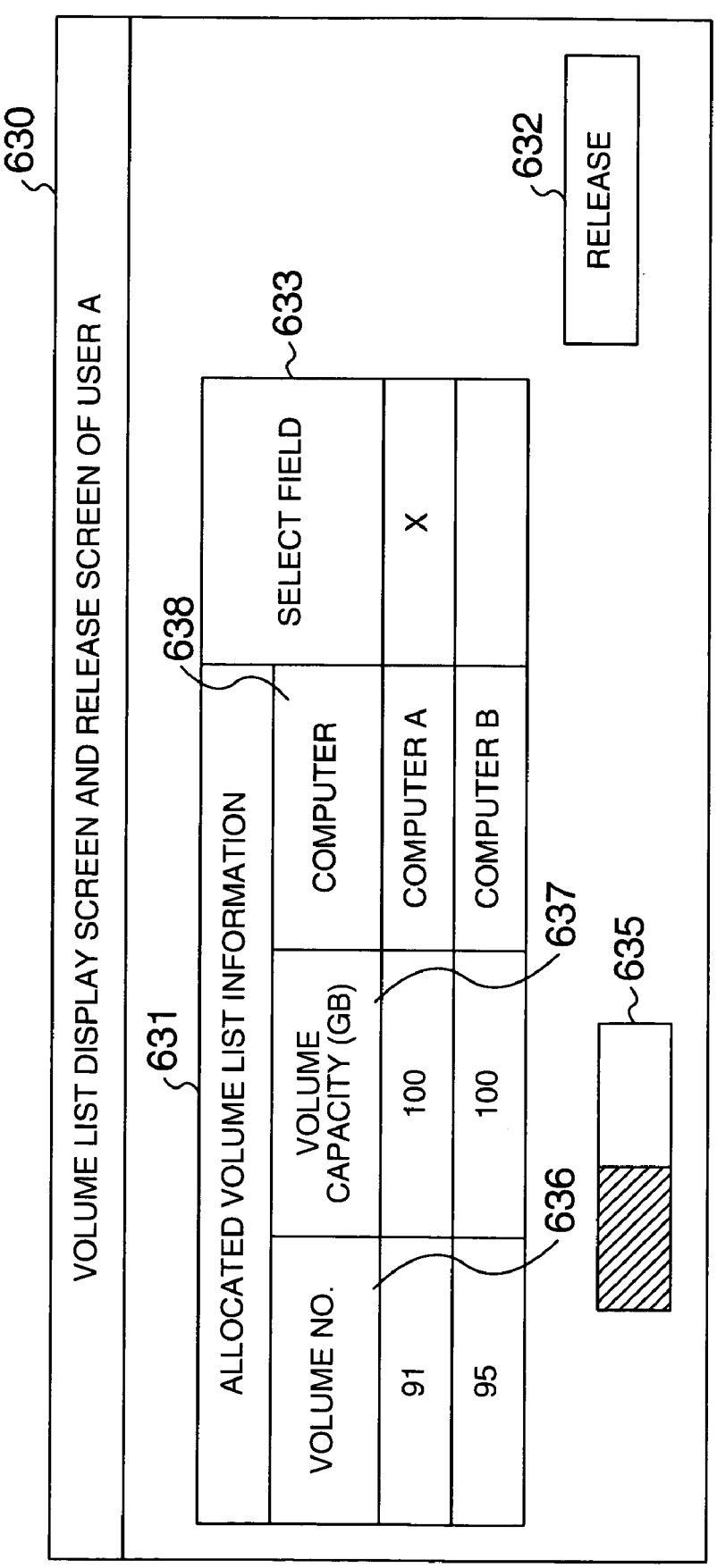

The volume release screen 630, shown in FIG. 5C, includes the allocated volume list information 631 for displaying the volume managed by the user (the user A in the example shown), a select field 633 for selecting the volume to be released, and a release button 632 for giving a release instruction. The list information 631 includes a volume number 636, a volume capacity 637 and a computer 638. Only the allocated volume information of the namespace ("N-A" in the example shown), input into the namespace 643 on the log-in screen 640, is displayed in the list information 631 included in the user management segment information 160 (FIG. 3). In the case of the user B, on the other hand, the information on the allocated volume of the namespace "N-B" is displayed in the allocated volume list information 631.

The volume release screen 630 may also include a display portion 635 for displaying the ratio of the volume capacity already allocated that represents the volume limit capacity of the user, as auxiliary information. The total of the volume capacity 637 divided by the capacity of the volume limit capacity information 190 of the user management segment information 160 can be displayed on the display portion 635.

Next, a description will be provided of the general process executed by the user A for allocating the volume to the computer A301.

FIG. 6 is a schematic diagram showing the computer system of FIG. 1. The user management segment information 160, shown in FIG. 3A, is stored in the memory 520 of the management server 500, and the allocated volume management information 180, shown in FIG. 2A, and the unallocated volume management information 185, shown in FIG. 2B, are stored in the memory 120 of the storage system 101. Specifically, the allocated volume 91 is allocated to the computer A301 through the fiber channel interface 130, and the allocated volume 93 is allocated to the computer B302 through the fiber channel interface 130. The management segment 162, shown in the schematic diagram of FIG. 6, shows the namespace "N-A" associated with the unallocated volume 80 and the allocated volume 91 which the user A has the right to access. The management segment 164, on the other hand, schematically shows the namespace "N-B" associated with the unallocated volume 80 schematically and the allocated volume 93 which the user B has the right to access. Under this condition, assume that a new volume is allocated by the user A to the computer A301. The management computer 400 receives the information input by the user A, through the volume allocation screen 620 shown in FIG. 5B, and sends to the management server 500 an allocation request made to the computer A (S601). The management server 500 reads the user management segment information 160, stored in the memory 520, and requests the storage system 101 to allocate the volume of the designated capacity from the usable unallocated volume 80 of the user A (S602). The storage system 101 allocates the volume 95 from the unallocated volume 80 and notifies the management server 500 (S603). The management server 500 registers the volume 95 in the management segment 162 of the user A (S604). In this way, the management server 500 updates the user management segment information 160 stored in the memory 520. As a result, the user A acquires the right to manage the volume 95, which can no longer be accessed or reconfigured by other users. The management server 500 issues a release screen display request, shown in FIG. 5C, from the management computer 400 by sending only the volumes 91, 95 in the management segment 162 of the user A (S605).

Thus, the user A can confirm only the volume managed by himself or herself on the volume release screen 630 (FIG. 5C) output to the output device 490 of the management computer 400. The volume 95, though newly allocated from the unallocated volume 80 shared by the user B, is registered in the management segment 162 of the user A and therefore cannot be accessed from the volume release screen 630 of the user B.

Next, the volume allocation process will be described in detail.

Figure 7:
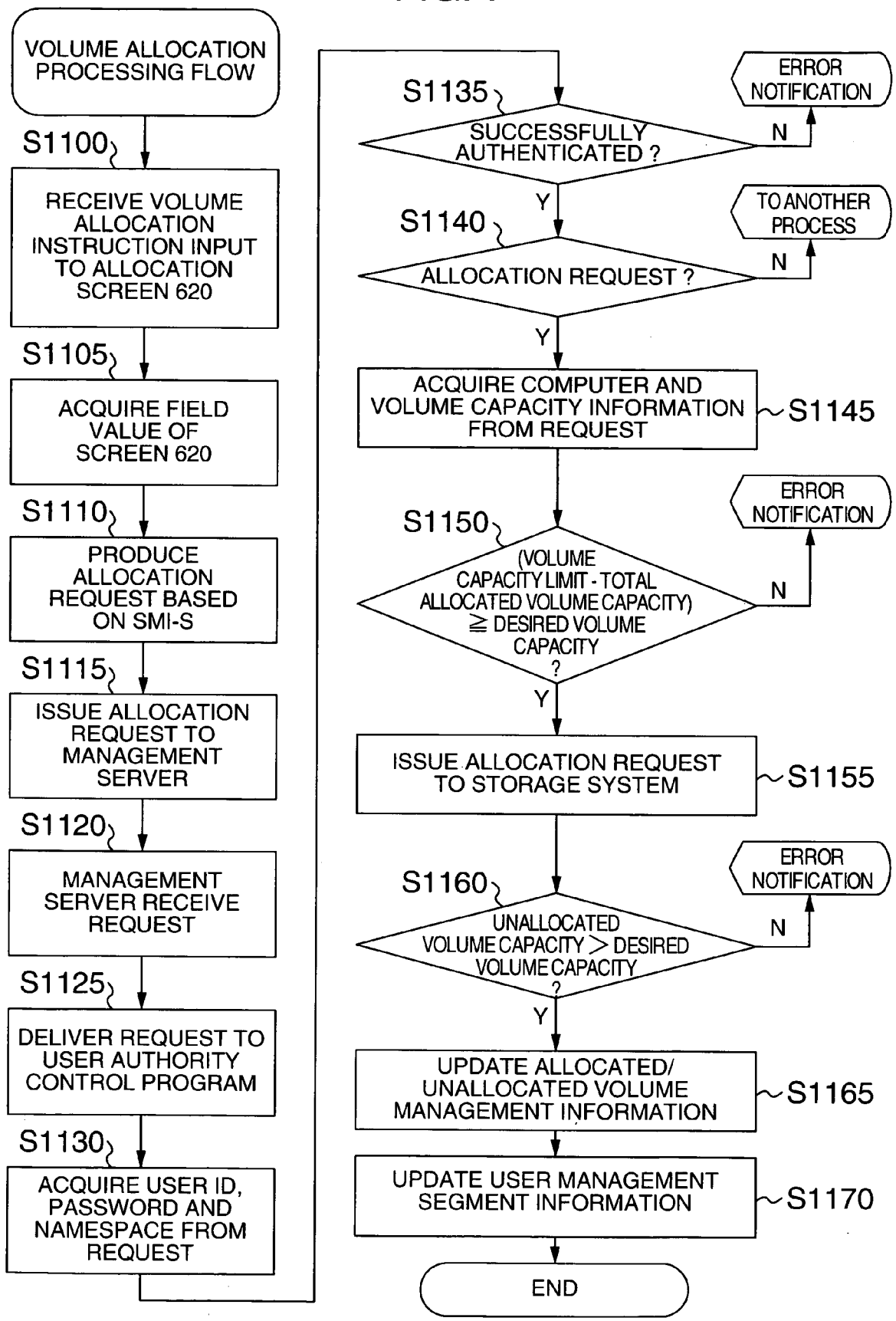
FIG. 7 is a flowchart showing the volume allocation process.

FIG. 7 is a flowchart showing the volume allocation process. Under the conditions of the user management segment information 160, shown in FIG. 3A, the allocated volume management information 180, shown in FIG. 2A, and the unallocated volume management information 185, shown in FIG. 2B, the user A allocates the volume of 100 GB to the computer A301 using the management computer 400. The process of steps 1100 to 1115 is implemented by the execution of the request sender program 423 by the CPU 410 of the management computer 400. The process of steps 1120 and 1125, alternatively, is implemented by the execution of the request receiver program 138 by the CPU 510 of the management server 500. The process of steps 1130 to 1155 is implemented by the execution of the user authority control program 132 by the CPU 510 of the management server 500. The process of steps 1160 to 1165 is implemented by the execution of the volume allocation program 134 by the CPU 110 of the storage system 101. The process of step 1170 is implemented by the execution of the user management segment-setting program 136 by the CPU 510 of the management server 500.

First, the user A gives a volume allocation instruction from the volume allocation screen 620 (FIG. 5B) displayed on the output device 490 of the management computer 400. The CPU 410 of the management computer 400 receives the allocation instruction input to the volume allocation screen 620 (step 1100). The CPU 410 acquires the information on the target computer and the volume capacity input by the user A using the input device 480 (step 1105). In this case, the CPU 410 acquires the information on the "computer A" 301 and "100 GB." The CPU 410 produces a volume allocation request based on SMI-S (step 1110). The CPU 410 sends the volume allocation request to the management server 500 through the network interface 450 (step 1115). The volume allocation request sent by the CPU 410 also contains the user ID "A," the password and the namespace "N-A" input on the log-in screen 640 (FIG. 5A).

The CPU 510 of the management server 500 receives the volume allocation request from the management computer 400 through the network interface 555 (step 1120), and delivers the received request to the user authority control program 132 (step 1125).

The CPU 510 acquires the user ID, the password and the namespace from the volume allocation request (step 1130). The CPU 510 authenticates the user A based on the user management segment information 160 stored in the memory 520 (step 1135). Specifically, the CPU 510 determines whether or not the user ID, the password, and the namespace that has been acquired are stored in the user management segment information 160. Once the user ID, password and namespace authentication is confirmed (YES in step 1135), the CPU 510 analyzes the request and determines whether or not the particular request is a request for the volume allocation (step 1140). This request is produced, upon the receipt of the instruction from the volume allocation screen 620, at which point the CPU 510 determines if the particular request is a request for the volume allocation (YES in step 1140). The CPU 510 acquires the information on the target computer and the volume capacity from the request (step 1145). In this case, the CPU 510 acquires the information on the computer A301 and a volume capacity of 100 GB.

Next, the CPU 510 calculates the total volume capacity of user A's allocated volume capacity 166 as indicated in the user management segment information 160 (FIG. 3A). The CPU 510 subtracts the calculated total volume capacity from the volume limit capacity information 168 in the user management segment information 160 and determines whether or not the resulting value is less than the currently requested volume capacity (100 GB) (step 1150). In the user management segment information 160, shown in FIG. 3A, the volume limit capacity 168 is 200 GB and the total volume capacity of the allocated volume is 100 GB. Thus, since the volume capacity of 100 GB remains to be allocated to the user A, therefore the CPU 510 determines that the volume allocation request of 100 GB can be met (YES in step 1150). The CPU 510 sends the volume allocation request of 100 GB for the computer A301 to the storage system 101 through the network interface 550 (step 1155). In a case where the CPU 510 determines that the volume allocation request cannot be met (NO in step 1150), alternatively, the CPU 510 sends the error information to the management computer 400 indicating that the volume allocation cannot occur. As a result, the user is informed that the volume allocation has ended in a failure.

The CPU 510 of the storage system 101 reads the unallocated volume management information 185 (FIG. 2B) stored in the memory 120, and determines whether or not the unallocated volume 80 has the volume capacity of 100 GB (step 1160). In the unallocated volume management information 185 shown in FIG. 2B, the unallocated volume capacity of 300 GB is available and therefore the CPU 110 determines the allocation is possible (YES in step 1160). The CPU 110 allocates the volume 95 of 100 GB from the unallocated volume 80 to the computer A301. The CPU 110 updates the allocated volume management information 180 and the unallocated volume management information 185 (step 1165). Specifically, the CPU 110, as shown in FIG. 8B, adds the newly allocated volume information 180a to the allocated volume management information 180. Also, as shown in FIG. 8C, the CPU 110 updates the unallocated volume capacity 187 of the unallocated volume management information 185 to 200 GB. Through the network interface 150, the CPU 110 notifies the user authority control program 132 of the management server 500 that the allocation of the volume 95 is complete.

In a case where the CPU 110 determines that the allocation cannot occur (NO in step 1160), the CPU 110 sends to the management server 500 error information indicating that the unallocated volume capacity is insufficient. The CPU 510 of the management server 500 sends that particular error information to the management computer 400. As a result of being provided with this error information, the user is informed that the volume allocation has ended in a failure.

Next, the CPU 510 of the management server 500 receives notification that the allocation is complete from the storage system 101 and executes the user management segment-setting program 136, thereby updating the user management segment information 160 (step 1170). Specifically, the CPU 510 sets the newly allocated volume 95 of 100 GB, the computer A in the allocated volume number 165, the volume capacity 166, and the computer 167, respectively, as shown in FIG. 8A. The CPU 510 executes the request receiver program 138 and thus sends the notification that the allocation request is complete to the management computer 400 through the network interface 555.

Through this volume allocation process, the volume 95 is newly allocated to the namespace "N-A" as a management segment of the user A. As a result, the right of the user A to access the volume 95 is set. Thus, the volume 95 can no longer be accessed by the user B but can be managed and used exclusively by the user A.

Next, an explanation will be provided to describe the process of displaying the volume release screen 630 (FIG. 5C) on the output device 490 of the management computer 400.

Figure 9:
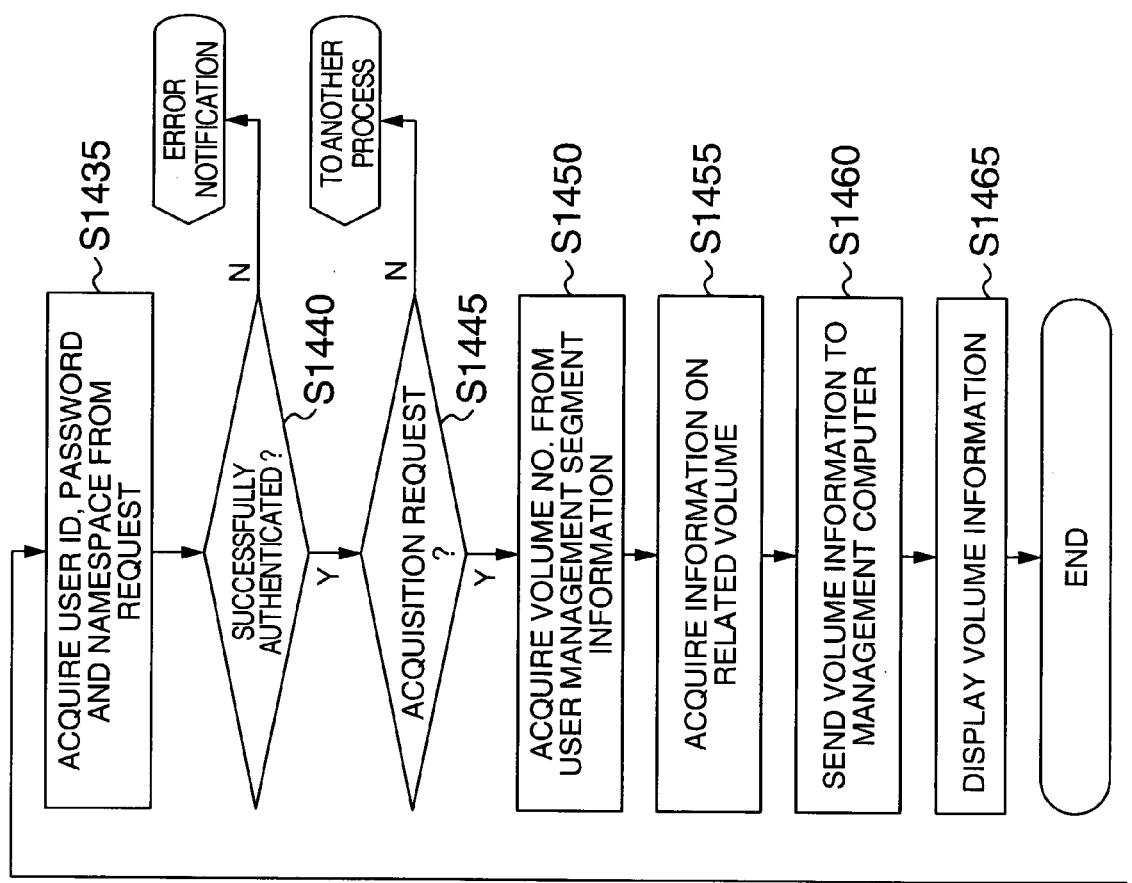
FIG. 9 is a flowchart showing the process for displaying the volume release screen.

FIG. 9 is a flowchart showing the display process of the volume release screen 630. In this example, the volume release screen 630 is displayed under the conditions of the user management segment information 160 shown in FIG. 8A, the allocated volume management information 180 shown in FIG. 8B, and the unallocated volume management information 185 shown in FIG. 8C. Also, the process of steps 1400 to 1420 and step 1465 is implemented by the CPU 410 of the management computer 400 executing the request sender program 423. The process of steps 1425 and 1430 is implemented by the execution of the request receiver program 138 by the CPU 510 of the management server 500. In similar fashion, the process of steps 1435 to 1460 is implemented by the execution of the user authority control program 132 by the CPU 510 of the management server 500.

First, the CPU 410 of the management computer 400 receives the instruction to display the volume release screen 630 that has been obtained from the log-in screen 640 that has been output to the output device 490 (step 1400). The CPU 410 acquires the value, entered by the user A into the input field of the log-in screen 640, using the input device 480 (step 1405), and determines that the release screen display button 644 has been depressed (step 1410). The CPU 410 produces a request, based on SMI-S, to acquire the volume information, managed by the user, that was input into ID field 645 of the log-in screen 640 (step 1415). The CPU 410 sends this volume information acquisition request to the management server 500 through the network interface 450 (step 1420). The volume information acquisition request also contains the user ID, the password and the namespace input on the log-in screen 640.

Next, the CPU 510 of the management server 500 receives the request from the management computer 400 through the network interface 555 (step 1425). The CPU 510 delivers this request to the user authority control program 132 (step 1430).

The CPU 510 acquires the user ID, the password, and the namespace from the request that has been received (step 1435). The CPU 510 authenticates the user A, as in step 1135 shown in FIG. 7, using the user management segment information 160 stored in the memory 520 (step 1140). Upon successful authentication (YES in step 1440), the CPU 510 analyzes the request and determines whether the request is for acquisition of the volume information managed by the user A (step 1445). This request is produced when, upon depression of the release screen display button 644 on the log-in screen 640, the instruction is received, and therefore the CPU 510 determines that the particular request is a request to acquire the volume information (YES in step 1445).

The CPU 510 acquires the volume numbers 91 and 95, from the user management segment information 160 (step 1450), that are managed in the namespace "N-A" by the user A. The CPU 510 acquires the volume capacity of each volume number that has been acquired and the information on the computer from the user management segment information 160 (step 1455). The CPU 510 sends the acquired volume information to the management computer 400 through the network interface 555 (step 1460).

Next, the CPU 410 of the management computer 400 acquires from the management server 500 the volume information that is managed by the user A, produces the allocated volume list information 631 of the volume release screen 630 shown in FIG. 5C, and displays it on the output device 490 (step 1465).

By this process, only the information on the volume (namespace) managed by each user is displayed on the volume release screen 630.

Next, the volume release process will be described.

FIG. 10 is a flowchart showing the volume release process. In this example, using the release screen 630, the user A executes the process for releasing the volume 91 allocated to the computer A301. The process of steps 1200 to 1215 is implemented by the execution of the request sender program 423 by the CPU 410 of the management computer 400. The process of steps 1220 and 1225 is implemented by the execution of the request receiver program 138 by the CPU 510 of the management computer 500. The process of steps 1230 to 1250 is implemented by the execution of the user authority control program 132 by the CPU 510 of the management computer 500. The process of step 1255 is implemented by the execution of the volume allocation program 134 by the CPU 110 of the storage system 101. The process of step 1260 is implemented by the execution of the user management segment-setting program 136 by the CPU 510 of the management server 500.

First, the CPU 410 of the management computer 400 receives a release instruction from the release screen 630 output to the output device 490 (step 1200). The CPU 410 acquires the value input by the user A into the input field of the release screen 630 using the input device 480 (step 1205). The CPU 410 produces an input volume release request based on SMI-S (step 1210). The CPU 410 sends this release request to the management server 500 through the network interface 450 (step 1215). The release request also contains the information on the user ID, the password, and the namespace input on the log-in screen 640.

Next, the CPU 510 of the management server 500 receives the request from the management computer 400 through the network interface 555 (step 1220). The CPU 510 delivers the received request to the user authority control program 132 (step 1225).

The CPU 510 acquires the user ID, the password, and the namespace from the received request (step 1230). The CPU 510 authenticates the user A, as in step 1135 shown in FIG. 7, using the user management segment information 160 stored in the memory 520 (step 1235). Upon successful authentication (YES in step 1235), the CPU 510 analyzes the request and determines whether this request is for the release of the volume managed by the user A (step 1240). This request is produced by receiving the instruction from the release screen 630, and the CPU 510 determines that the particular request is for the release of the volume (YES in step 1240). The CPU 510 acquires the desired release volume number 91 from the request (step 1245). The CPU 510 requests, through the network interface 550, the storage system 101 to release the volume 91 and to return the released volume to an unallocated volume 80 (step 1250).

Next, the CPU 110 of the storage system 101 releases the volume 91 allocated to the computer A301, and updates the allocated volume management information 180 and the unallocated volume management information 185 (step 1255). Specifically, the CPU 110 reads the allocated volume management information 180 (FIG. 8B) stored in the memory 120, and deletes the row reserved for the volume 91 in the allocated volume management information 180. Also, the CPU 110 updates the volume capacity of the unallocated volume management information 185 to 300 GB. Through the network interface 150, the CPU 110 notifies the user authority control program 132 of the management server 500 that the volume 91 has been completely released.

Next, the CPU 510 of the management server 500 receives the notification on the volume release from the storage system 101, and executes the user management segment-setting program 136, thereby updating the user management segment information 160 (step 1260). Specifically, the CPU 510 deletes the volume 91 allocated to the user A from the user management segment information 160 shown in FIG. 8A. The CPU 510 executes the request receiver program 138 and thus notifies the management computer 400 through the network interface 555 that the volume is completely released as requested. As a result of this notification, the CPU 410 of the management computer 400 outputs to the output device 490 the release screen 630 from which the volume 91 has been deleted.

This volume release process permits each user to release the volume as required even in a case where the volume is allocated as his/her management segment. As a result, it is not necessary to manage volume which each user stopped using and thus users can utilize the volume of the storage system as a whole.

A second embodiment will be described below.

FIG. 11 is a schematic diagram showing a computer system according to a second embodiment. As described below, the computer system shown in FIG. 11 is different from the computer system according to the first embodiment shown in FIG. 1. First, the computer system according to this embodiment is different from that of the first embodiment in that the computer system according to this embodiment comprises a plurality of storage systems, including a storage system A101 and a storage system B102. The storage systems A101, B102 have a similar configuration to the storage system A101 explained above with reference to FIG. 1.

The management server 500 according to this embodiment controls the allocation and the release of the volume of a plurality of the storage systems A101, B102. Therefore, to facilitate centralized management, the management server 500 is required to acquire the information on the volume of the plurality of the storage systems A101, B102. The management server 500, according to this embodiment, therefore, is different from the management server of the first embodiment in that the memory 120 includes the allocated volume integrated management information 180A and the unallocated volume integrated management information 185A.

Figure 12A:
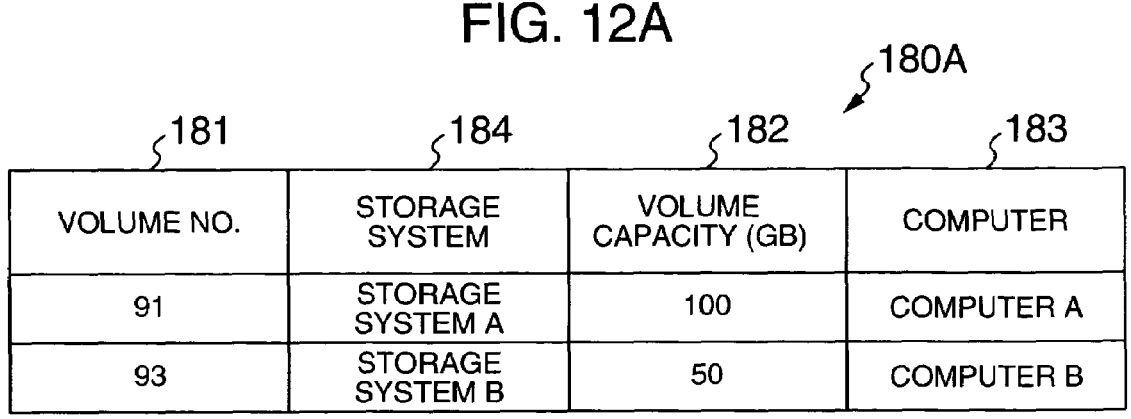
FIGS. 12A and 12B are diagrams illustrating the configurations of the allocated volume integrated management information and the unallocated volume integrated management information.

FIG. 12A shows an example of the allocated volume integrated management information 180A. As shown in FIG. 12A, the allocated volume integrated management information 180A includes a volume number 181, a storage system 184, a volume capacity 182, and a computer 183. The ID information for identifying the storage systems 101, 102 is set in the storage system 184. According to this embodiment, the "storage system A" or the "storage system B" is set in the storage system 184.

Figure 12B:
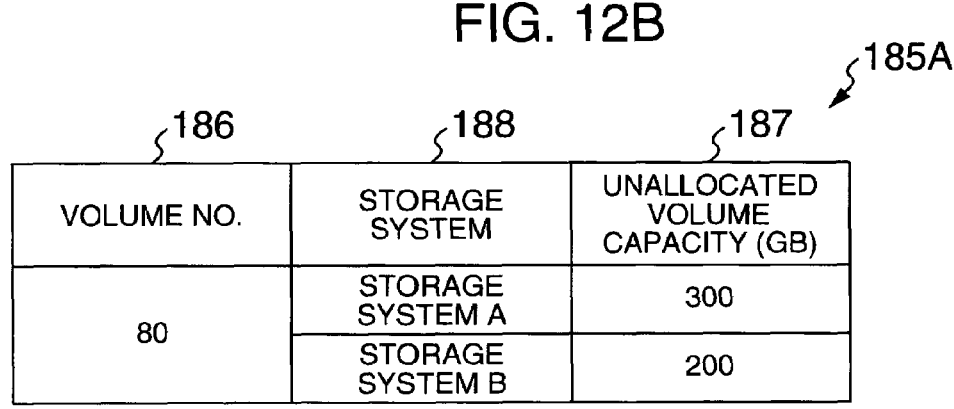

FIG. 12B shows an example of the unallocated volume integrated management information 185A. As shown in FIG. 12B, the unallocated volume integrated management information 185A includes a volume number 186, a storage system 188, and an unallocated volume capacity 187. The ID information for identifying the storage systems 101, 102 is set in the storage system 188. Also, the unallocated volume capacity for each storage system is set in the unallocated volume capacity 187.

According to this embodiment, the volume number "80" is set in the integrated volume of the unallocated volumes of the storage systems A101 and B102. However, different volume numbers may be set and managed in the volumes of the storage systems A101 and B102. Also, two or more unallocated volumes are allocated to a different user, and each user may be able to use the unallocated volumes. According to this embodiment, the volume is allocated, at the request of the user, by using the unallocated volumes of the storage systems A101 and B102 alternately (but, it is used for the beginning from the storage system A101) as long as the volume capacity remains sufficient.

According to this embodiment, after a volume is released, this volume is returned to the unallocated volume management information 185. However, the computer system may be configured so that, even after the volume is released, this particular released volume may not be returned to the unallocated volume management information 185, while only the user (management computer) that has allocated and released the particular volume can access or alter the configuration.

Figure 13:
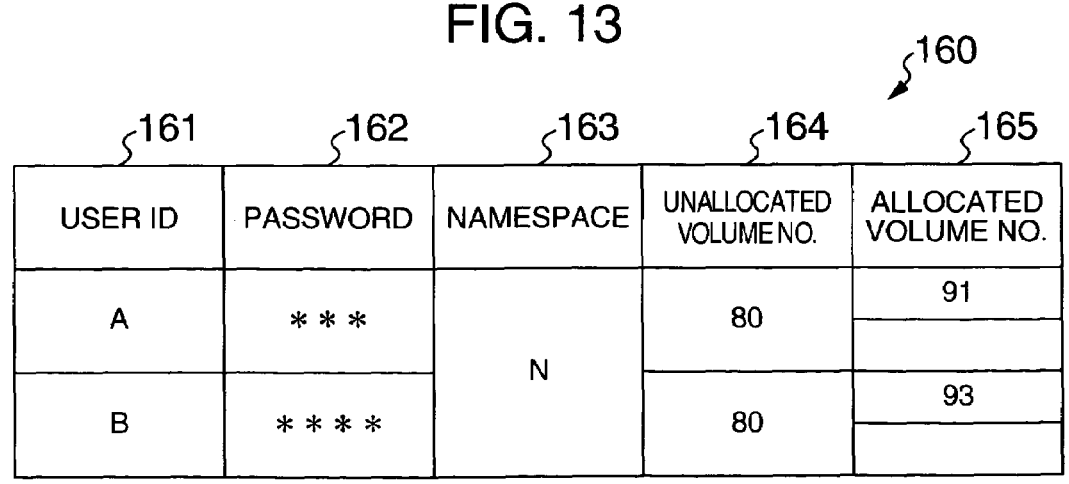
FIG. 13 is a diagram illustrating the configuration of the user management segment information.

Next, FIG. 13 shows an example of the user management segment information 160 according to this embodiment. As shown in FIG. 13, this user management segment information 160 is different from the user management segment information 160 according to the first embodiment, shown in FIGS. 3A and 3B, in that the user management segment information 160 according to the present embodiment of this invention lacks the volume capacity 166, the computer 167, and the volume capacity limit information 168. The absence of the volume capacity limit information 168 permits each user to freely use the unallocated volume. Also, according to this embodiment, the namespace is not set for each user but, rather, the volume allocated to each user is accessible in a common namespace "N."

Next, the volume allocation process according to this embodiment will be described.

Figure 14:
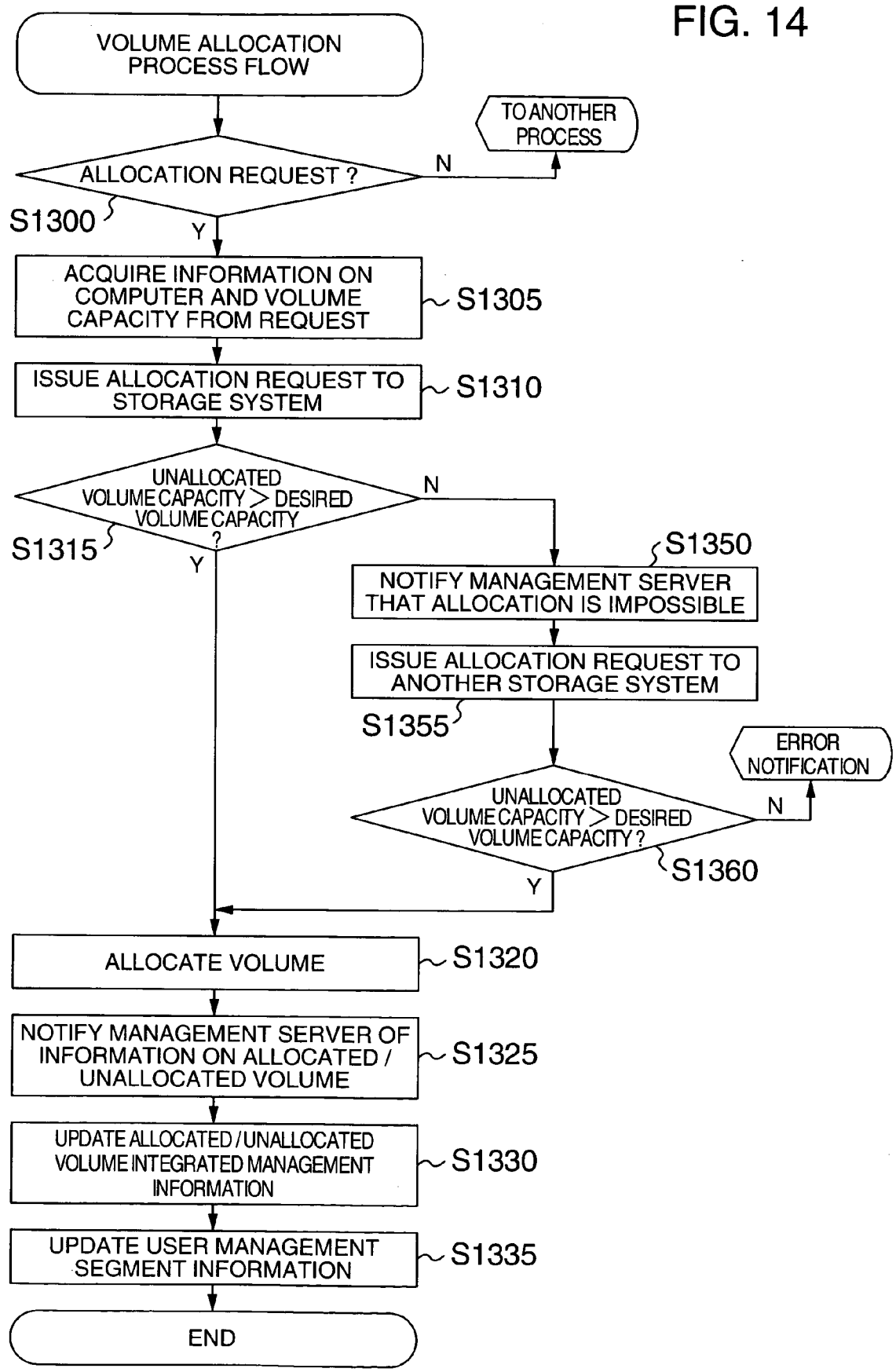
FIG. 14 is a flowchart showing the volume allocation process.

FIG. 14 is a flowchart showing the volume allocation process. For example, using the management computer 400 under the conditions of the user management segment information 160, shown in FIG. 13, the allocated volume integrated management information 180A, shown in FIG. 12A, and the unallocated volume integrated management information 185A, shown in FIG. 12B, the user A newly allocates the volume of 100 GB to the computer A301. The process of steps 1300 to 1310 and steps 1330 and 1355 is implemented by the execution of the user authority control program 132 by the CPU 510 of the management server 500. The process of steps 1315 to 1325 and steps 1350 and 1360 is implemented by the execution of the volume allocation program 134 by the CPU 110 of the storage systems 101, 102. Similarly, the process of step 1335 is implemented by the execution of the user management segment-setting program 136 by the CPU 510 of the management server 500.

In the volume allocation flowchart shown in FIG. 7, the management computer 400 and the management server 500, though not shown, first execute the process of steps 1100 to 1135. Upon successful user authentication, the CPU 510 of the management server 500 analyzes the request sent from the management computer 400 and determines that this request is for volume allocation (step 1300). The CPU 510 acquires the information on the target computer and the volume capacity from this request (step 1305). In this case, the CPU 510 acquires target computer information "computer A" and volume capacity "100 GB." The CPU 510 sends the volume allocation request to the storage system A101 through the network interface 550 (step 1310). According to this embodiment, the volume is allocated by using the unallocated volume of the storage system A101 and the unallocated volume of the storage system B102 alternately with each other. In this case, assume that the next unallocated volume to be used is that of the storage system A101.

Next, the CPU 110 of the storage system A101 reads the unallocated volume management information 185 (FIG. 2B) stored in the memory 120 and determines whether or not the requested volume capacity (100 GB) is larger than the unallocated volume capacity 187 (step 1315). In this case, the volume capacity of 300 GB is assumed to be set in the unallocated volume capacity 187 as shown in FIG. 2B. Thus, the CPU 110 determines that the allocation is possible (YES in step S1315), and allocates the volume 95 of 100 GB to the computer A301, thereby updating the allocated volume management information 180 and the unallocated volume management information 185 (step 1320). The CPU 110 sends the updated allocated volume management information 180 and the updated unallocated volume management information 185 to the user authority control program 132 of the management server 500 (step 1325).

Next, the CPU 510 of the management server 500 receives the updated allocated volume management information 180 and the updated unallocated volume management information 185. On the basis of this information, the CPU 510 updates the allocated volume integrated management information 180A and the unallocated volume integrated management information 185A, as shown in FIGS. 15B and 15C (step 1330). The CPU 510 executes the user management segment-setting program 136, thereby updating the user management segment information 160 (step 1335). Specifically, the CPU 510 adds 95 to the allocated volume number 165 of the user A, as shown in FIG. 15A. The CPU 510 executes the request receiver program 138, and notifies the management computer 400, through the network interface 555, that the allocation request is completed.

Alternatively, when the unallocated volume capacity 187 is smaller than the requested volume capacity (NO in step 1315), the CPU 110 notifies the user authority control program 132 of the management server 500 that the allocation cannot occur (step 1350). The CPU 510 of the management server 500 receives the notification that the allocation cannot occur, and sends an allocation request to the storage system B102 of the unallocated volume to be used next (step 1355). The CPU 110 of the storage system B102 executes a process similar to step 1315.

As the result of this volume allocation process, the user A can allocate the volume 95, managed by the user A, from the unallocated volume of the storage system A101 or the storage system B102. Thus, the right of the user A to manage the volume 95 is set in the volume 95, which cannot be accessed by the user B but can be managed and used exclusively by the user A.

Next, a description will be provided for a process of displaying the release screen 630 (FIG. 5C) on the output device 490 of the management computer 400, according to this embodiment.

Figure 16:
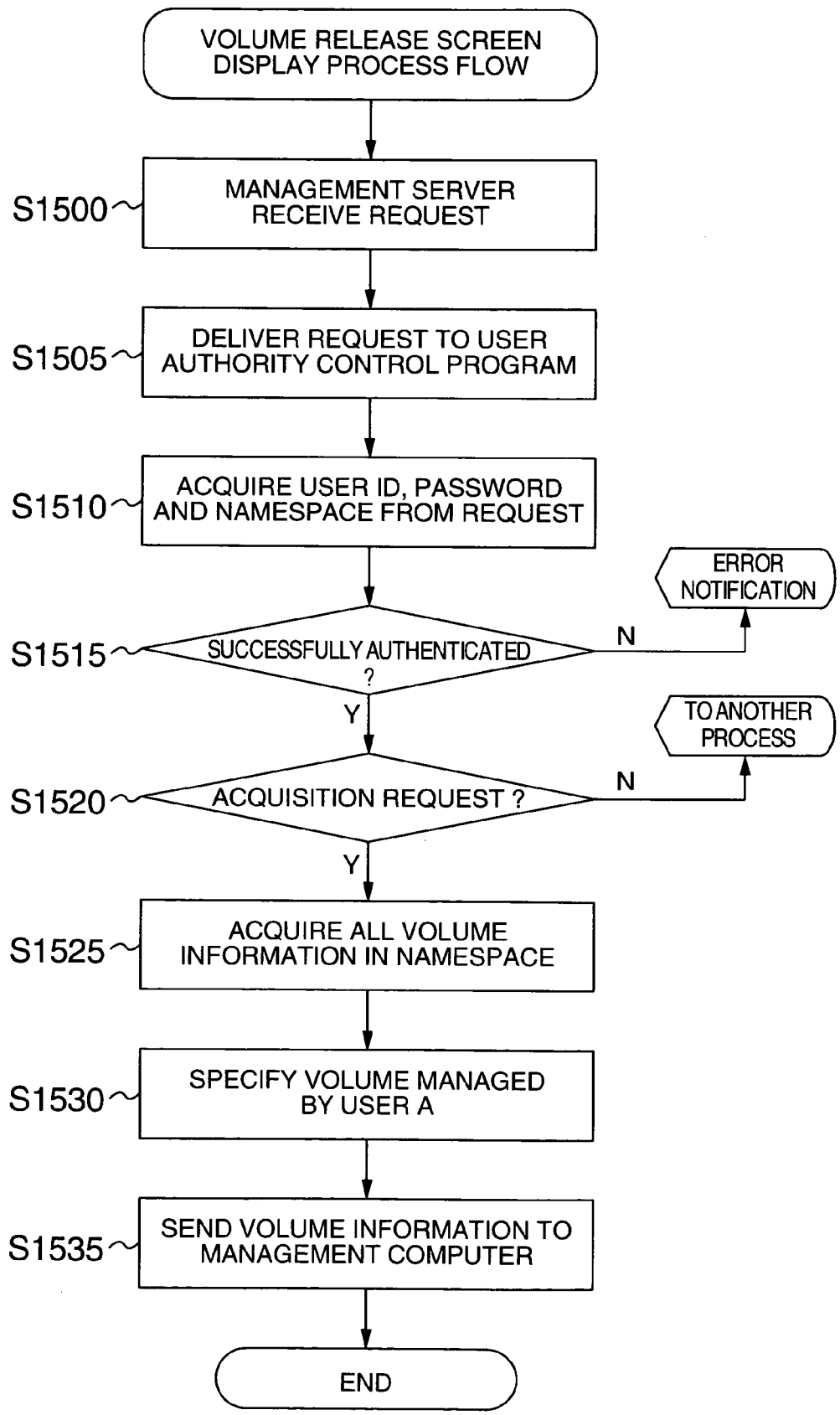
FIG. 16 is a flowchart showing the process for displaying the volume release screen.

FIG. 16 is a flowchart showing the process of displaying the release screen 630. For example, the release screen 630 of the user A is displayed under the conditions set in the user management segment information 160 shown in FIG. 15A, the allocated volume integrated management information 180A, shown in FIG. 15B, and the unallocated volume integrated management information 185A shown in FIG. 15C. The process of steps 1500 and 1505 is implemented by the execution of the request receiver program 138 by the CPU 510 of the management server 500. Also, the process of steps 1510 to 1535 is implemented by the execution of the user authority control program 132 by the CPU 510 of the management server 500 executing.

First, by employing a process similar to the display process of steps 1400 to 1420 shown in FIG. 9 (step 1500), the CPU 510 of the management server 500 acquires a request from the management computer 400 through the network interface 555. The CPU 510 delivers the received request to the user authority control program 132 (step 1505).

CPU 510 acquires the user ID, the password, and the namespace from the received request (step 1510). Using the user management segment information 160 stored in the memory 520 (step 1515), the CPU 510 authenticates the user, in a way similar to step 1135 shown in FIG. 7. Upon successful authentication (YES in step 1515), the CPU 510 analyzes the request to determine whether the request is for the acquisition of the volume information managed by the user A (step 1520). This request is produced by receiving the instruction created by the depression of the release screen display button 644 of the log-in screen 640. The CPU 510 thus determines that this particular request is for the acquisition of the volume information (YES in step 1520).

The CPU 510 acquires the information on all the volumes managed in the namespace "N" from the user management segment information 160 (step 1525). In this case, the CPU 510 acquires the volume information of the volume numbers 91, 93, 95. The CPU 510 specifies (extracts) the volume numbers 91, 95 having the user ID and the password acquired in step 1510 (step 1530). Of the information on all the volumes in the namespace "N" acquired in step 1525, the CPU 510 sends only the information on the volume numbers 91, 95 to the management computer 400 through the network interface 555 (step 1535).

The CPU 410 of the management computer 400 acquires from the management server 500 the information on the volume managed by the userA, produces the allocated volume list information 631 of the release screen 630, as shown in FIG. 5C, and displays it on the output device 490. As the result of this process, only the information on the volume managed by each user is displayed on the release screen 630 of the user.

According to the first and second embodiments, described above, a common unallocated volume accessible (allocable) by a plurality of users is produced in the storage system. In a case in which the user allocates a new volume, the volume required to satisfy a request for volume is allocated from the common unallocated volume, and the volume allocated in this way is automatically registered as a management segment of the user having the right to manage the volume. As a result, since each user can allocate the required volume, the utilization rate of the storage system is improved. Also, the user can more fully take advantage of the storage system.

Specifically, each user can effectively utilize the volume of the storage system by allocating the required volume. Also, the workload of the general administrator of the computer system can be reduced.

Furthermore, the user allocates or releases his or her volume using the volume allocation screen 620 and the volume release screen 630, thereby reducing the workload of the general administrator of the computer system. Accordingly, the general administrator is not required to monitor the unallocated volume of the management segment managed by each user and to redistribute the management segment of each user in the case of overage or shortage. Therefore, the general administrator can concentrate on the management of monitoring the unallocated volume in the whole storage system. Moreover, since the volume allocated to the user is registered in the user management segment information 160, the management right of the user is automatically set, and therefore the general administrator is not required to set the user's right to manage the allocated volume.

The user can access or alter only the volume allocated by him or her and can neither access nor alter the volume allocated by other users. As a result of this restriction, in a case in which, for example, one storage system (storage system 101) is used by a plurality of companies, the specific allocation (volume management information) of the volume by the system administrator (user) of a company cannot be accessed by the administrators (users) of other companies. In this way, security is maintained.

This invention is not limited to the aforementioned embodiments but can be modified in various ways without departing from the spirit of the invention.

In the first embodiment, for example, the provision of the volume limit capacity information 190 in the user management segment information 160 prevents a specific user from monopolizing the use of the unallocated volume. The invention, however, is not limited to this embodiment. For example, a specific user may be prevented from monopolizing an unallocated volume by calculate the total volume capacity of the allocated volume in the management segment of each user and charge the user in accordance with the allocated total volume capacity. In a specific example, a user to which 1 GB is allocated is required to pay a predetermined amount (say, 85 dollars) as a service charge per month.

The first embodiment comprises one storage system 101 in which the namespace is set for each user. The second embodiment, alternatively, comprises a plurality of storage systems 101, 102, in which a common namespace is set for all the users. While not limiting the scope of the invention, the above examples provide for a common namespace that may be set for all the users with a single storage system 101, or a namespace that may be set for each user with a plurality of storage systems 101, 102.

According to the first and second embodiments, the volume is allocated or released using the management interface of the storage system by CIM and WBEM. The invention, however, is not limited to these embodiments, but may use other management interfaces of storage systems.

It should be further understood by those skilled in the art that, although the foregoing description has been made of embodiments of the invention, the invention is not limited thereto and various changes and modifications may be made in alternative embodiments without departing from the spirit of the invention and the scope of the appended claims.

The invention claimed is:

1. A storage system management method for managing a volume held by a storage system to store data, the storage system having user management information storing information on a volume that can be allocated by each user, the method comprising the steps of:
   receiving a volume allocation request including a user identifier and a computer identifier from an external system, wherein said volume allocation request further includes an allocation volume capacity;
   allocating, based on said volume allocation request, a volume to a computer corresponding to said computer identifier from an unallocated volume of said storage system that can be allocated by all the users; and
   registering the volume allocated in said user management information as a volume to be managed exclusively by a user corresponding to said user identifier, wherein said volume can be accessed only by said user and not by other users and wherein said management information further includes a maximum volume capacity that can be allocated by each user;
   receiving a volume release request with said user identifier and a volume of said user to be released, from an external system;
   releasing said volume to be released based on said volume release request and returning the released volume to an unallocated volume of said storage system that can be allocated by all the users;
   deleting said released volume from the volumes managed by the user of said user in said user management information;
   adding said allocation-requested volume capacity to a volume capacity calculated based on said user management information and thus far allocated by the user, and judging whether said sum is smaller or not than said maximum volume capacity of said user, wherein the user is able to access only volumes allocated by said user and cannot access the volumes allocated by other users; and
   executing said allocation process in a case where said sum is smaller than said maximum volume capacity, and not executing said allocation process in the case where said sum is larger than said maximum volume capacity.

2. A storage system management method according to claim 1, wherein error information is output to said external system in the case where said judgment shows that said sum is larger than said maximum volume capacity.

3. A storage system management method according to claim 1, further comprising the step of:
   judging whether said allocation-requested volume capacity is smaller or not than the unallocated volume capacity of said storage system, and in the case where said allocation-requested volume capacity is larger than said unallocated volume capacity, outputting the error information to said external system.

4. A storage system management method according to claim 1, further comprising the steps of:
   receiving the user identifier and a request to acquire a volume managed by said user from an external system; and
   based on said acquisition request, sending only the volume managed by said user of said user identifier from said user management information to said external system.

5. A storage system management method according to claim 4, further comprising the step of:
   sending said volume to said external system using the management interface defined by Common Information Model and Web-Based Enterprise Management.

6. A storage system management method according to claim 1,
   wherein a plurality of said storage systems are included,
   wherein said volume allocation request further includes an allocation-requested volume capacity,
   said method further comprising the steps of:
   judging whether said allocation-requested volume capacity received in said receiving step can be allocated to the volume of a predetermined one of said plurality of the storage systems;
   in the case where said allocation-requested volume capacity can be allocated to the volume of said predetermined storage system, allocating the volume to said computer, based on said volume allocation request, from the unallocated volume of said predetermined storage system that can be allocated by all the users; and
   in the case where said allocation-requested volume cannot be allocated to the volume of said predetermined storage system, allocating the volume to said computer, based on said volume allocation request, from the unallocated volume of other than said predetermined storage system that can be allocated by all the users.

7. A storage system management method according to claim 1, further comprising the step of:
   obtaining a user ID, a password and a name space based on said volume allocation request, then conducting user authentication based on the user ID, the password and the name space with reference to said user management information, and performing said allocating step when the user authentication succeeds.

8. A computer system comprising a storage system for holding a volume to store data and at least a management device for managing the volume of said storage system;
   wherein said management device includes storage means which stores user management information including information on volumes that can be allocated by each user, receiving means which receives a volume allocation request including a user identifier and a computer identifier from an external system, sending means which sends said volume allocation request to said storage system, and updating means which updates said user management information managed by a user corresponding to said user identifier based on information on an allocated volume received from said storage system; and
   wherein said storage system includes allocation means which receives said volume allocation request from said management device and allocates the volume, based on said volume allocation request, to an allocation computer corresponding to said computer identifier from an unallocated volume that can be allocated by all the users, and means for sending the information on the volume allocated by said allocation means, to said management device, wherein said management computer:

receives from an external system a volume release request with said user identifier information and a volume to be released;

releases said volume to be released, based on said volume release request, and returns said released volume to an unallocated volume of said storage system that can be allocated by all the users, wherein the user is able to access only the volume allocated by said user and cannot access the volumes allocated by other users; and deletes the volume released from the volumes managed by the user of said user identifier in said user management information, wherein said volume allocation request further includes an allocation-requested volume capacity, and wherein said user management information further includes the maximum volume capacity that can be allocated by said user, said computer system further comprising a means for adding said allocation-requested volume capacity to the volume capacity of the volume calculated based on said user management information and thus far allocated by the user of said user identifier and judging whether said sum is smaller than said maximum volume capacity of said user or not, wherein in the case where said sum is smaller than said maximum volume capacity, said allocation means allocates the volume to said allocation computer from the unallocated volume that can be allocated by all the users, based on said volume allocation request, and wherein in the case where said sum is larger than said maximum volume capacity, said allocation means allocates no volume to said allocation computer.

9. A computer system according to claim 8, wherein said judging means outputs error information to said external system in the case where said sum is larger than said maximum volume capacity.

10. A computer system according to claim 8, wherein said allocation means judges whether said allocation-requested volume capacity is smaller or not than the unallocated volume capacity of said storage system, and in the case where said allocation-requested volume capacity is larger than said unallocated volume capacity, outputs error information to said external system.

11. A computer system according to claim 8, further comprising:

an acquisition request receiving means for receiving a request to acquire user information and a volume managed by said user, from an external system; and a sending means for sending only the volume managed by the user of said user information from said user management information to said external system, based on said acquisition request.

12. A computer system according to claim 11, wherein said sending means uses the management interface defined by Common Information Model and Web-Based Enterprise Management.

13. A computer system according to claim 8, comprising a plurality of said storage systems, wherein said volume allocation request further includes an allocation-requested volume capacity, wherein said allocation means judges whether said allocation-requested volume capacity received by said receiving means can be allocated to the volume of a predetermined one of said plurality of the storage systems, wherein in the case where said allocation-requested volume capacity can be allocated to the volume of said predetermined storage system, allocating the volume to said allocation computer, based on said volume allocation request, from the unallocated volume of said predetermined storage system that can be allocated by all the users, and wherein in the case where said allocation-requested volume cannot be allocated to the volume of said predetermined storage system, allocating the volume to said allocation computer, based on said volume allocation request, from the unallocated volume of other than said predetermined storage system that can be allocated by all the users.

14. A computer system according to claim 8, wherein said allocation means obtains a user ID, a password and a name space based on said volume allocation request, then conducts user authentication based on the user ID, the password and the name space with reference to said user management information, and allocates the volume, based on said volume allocation request, to the each allocation computer from the unallocated volume that can be allocated by all the users, when the user authentication succeeds.

15. A storage system for holding a volume to store data, comprising an interface connected with an external system, a CPU connected to said interface and a memory connected to said CPU and said interface, wherein said memory holds user management information containing the information on the volume that can be allocated by each user, wherein said CPU receives a volume allocation request containing a user identifier and a computer identifier from an external system; allocates the volume to an allocation computer corresponding to said computer identifier from the unallocated volume of said storage system that can be allocated by all the users, based on said volume allocation request; and registers said allocated volume in said user management information as a volume managed exclusively by a user corresponding to said user identifier, wherein the user is able to access only volumes allocated by said user and cannot access the volumes allocated by other users, wherein said CPU receives a volume release request including the user identifier and a volume to be released, from an external system; releases said volume to be released in response to said volume release request and returns the released volume to an unallocated volume of said storage system that can be allocated by all the users; and deletes the volume released from the volumes managed by the user in said user management information, wherein said volume allocation request further includes an allocation-requested volume capacity, wherein said user management information further includes a maximum volume capacity that can be allocated by each user, and wherein said CPU adds said allocation-requested volume capacity to the volume capacity calculated based on said user management information and thus far allocated by the user and judges whether said sum is smaller or not than said maximum volume capacity of said user; in the case where said sum is smaller than said maximum volume capacity, allocates the volume to said allocation computer from the unallocated volume that can be allocated by all the users, based on said volume allocation request; and in the case where said sum is larger than said maximum volume capacity, outputs error information to said external system without allocating the volume to said allocation computer.

16. A storage system according to claim 15, wherein said CPU obtains a user ID, a password and a name space based on said volume allocation request, then conducts user authentication based on the user ID, the password and the name space with reference to said user management information, and allocates the volume, based on said volume allocation request, to the each allocation computer from the unallocated volume that can be allocated by all the users, when the user authentication succeeds.

17. A computer system comprising a storage system for holding a volume to store the data used by a computer, a management device for managing the volume of said storage system and a management computer for setting the volume of said storage system, wherein said management computer includes a network interface for connecting said management device, an input device and a processing unit, wherein said processing unit receives a volume allocation request including a user-identifier, a computer identifier, and an allocation-requested volume capacity from said input device and sends said volume allocation request to said management device through said network interface, wherein said management device includes a first network interface for connecting said management computer; a second network interface for connecting said storage system; a first storage means for storing user management information including the information on the volume allocable by a user corresponding to said user identifier and the volume allocable to a computer corresponding to said computer identifier and the maximum storage capacity allocable by said user; and a first processing unit, wherein the user is able to access only volumes allocated by said user and cannot access volumes allocated by other users;

wherein said first processing unit receives said volume allocation request from said management computer through said first network interface; adds said allocation-requested volume capacity to the volume capacity calculated based on said user management information and thus far allocated by the user of said user information and judges whether said sum is smaller or not than said maximum storage capacity of said user; and in the case where said sum is smaller than said maximum storage capacity, sends said volume allocation request to said storage system through said second network interface, and based on the information on the allocated volume received from said storage system, updates said user management information managed by said user;

wherein storage system includes a third network interface for connecting said management device, a second storage means for storing the allocation management information to manage the allocated volume and the unallocated management information to manage the unallocated volume, and a second processing unit; and wherein said second processing unit receives said volume allocation request from said management device through said third network interface; judges whether the allocation-requested volume capacity in said volume allocation request is smaller or not than the unallocated volume capacity included in said unallocated management information; and in the case where said allocation-requested volume capacity is smaller than said unallocated volume capacity, allocates the volume to said computer from said unallocated volume based on said volume allocation request, adds said allocated volume to said allocated volume management information and sends said allocated volume information to said management device through said third network interface;

wherein said first processing unit of said management device receives a volume release request including the user identifier and a volume to be released from said management computer, updates the volume capacity calculated based on said user management information and thus far allocated by the user and sends said volume allocation request to said storage system through said second network interface and, based on the released volume information received from said storage system, updates said user management information managed by said user; and wherein said second processing unit receives said volume release request from said management device through said third network interface, releases said volume to be released in response to said volume release request and returns the released volume to said unallocated volume capacity of said storage system; and notifies said management device to delete the released volume from the volume managed by the user corresponding to said user identifier in said user management information.

18. A storage system according to claim 17, wherein said processing unit error information to said external system in a case where said sum is larger than said maximum volume capacity.

19. A storage system according to claim 17, wherein said processing unit outputs error information via said network interface in a case where said sum is larger than said maximum volume capacity.

20. A computer system according to claim 17, wherein said first processing unit obtains a user ID, a password and a name space based on said volume allocation request, then conducts user authentication based on the user ID, the password and the name space with reference to said user management information, and performs said judgment when the user authentication succeeds.

21. A storage system management method for managing a volume held by a storage system to store data, the storage system having user management information storing information on a volume that can be allocated by each user, the method comprising the steps of:

receiving a volume allocation request including information on a user and on a computer from an external system;

allocating, based on said volume allocation request, a volume to said computer from the unallocated volume of said storage system that can be allocated by all the users;

registering the volume allocated in said user management information as a volume to be managed by the user of said user information;

receiving a volume release request including the user information and a volume to be released, from an external system;

releasing said volume to be released based on said volume release request and returning the released volume to an unallocated volume of said storage system that can be allocated by all the users; and deleting said released volume from the volume manged by the user of said user information in said user management information.

22. A computer system comprising: a storage system for holding the volume to store data and at least a management computer for managing the volume of said storage system, wherein said management computer is configured to:

store the user management information including the information on the volume that can be allocated by each user;

receive a volume allocation request including the information on the user and an allocation computer from an external system;

send said volume allocation request to said storage system; and update said user management information managed by the user in said user information based on the information on the allocated volume received from said storage system, wherein the storage system is configured to:

receive said volume allocation request from said management computer;

allocate the volume, based on said volume that can be allocated by all the users; and send the information on the volume allocated to said management computer, wherein said management computer is further configured to:

receive from an external system a volume release request including the user information and the volume to be released;

release said volume to be released, based on said volume release request;

return said released volume to an unallocated volume of said storage system that can be allocated by all the users; and delete the volume released from the volume managed by the user of said user information in said user management information.

23. A storage system for holding the volume to store data, comprising: an interface connected with an external system; a CPU connected to said interface; and a memory connected to said CPU and said interface, wherein said memory holds the user management information containing the information on the volume that can be allocated by each user, wherein said CPU is configured to:

receive a volume allocation request containing the information on the user and the allocation computer from an external system;

allocate the volume to said allocation computer from the unallocated volume of said storage system that can be allocated by all the users, based on said volume allocation request; and register said allocated volume in said user management information as a volume managed by the user of said user information, wherein said CPU is further configured to:

receive a volume release request including the user information and the volume to be released from an external system;

release said volume to be released in response to said volume release request;

return the released volume to an unallocated volume of said storage system that can be allocated by all the users; and delete the volume released by said releasing means from the volume manged by the user of said user information in said user management information.

* * * * *